(12) United States Patent
Baer et al.

(10) Patent No.: US 7,961,255 B2
(45) Date of Patent: *Jun. 14, 2011

(54) TELEVISION FUNCTIONALITY ON A CHIP

(75) Inventors: David A. Baer, San Jose, CA (US); Jeff Tingley, San Jose, CA (US); Aleksandr Movshovich, Santa Clara, CA (US); Brad Grossman, Sunnyvale, CA (US); Brian F. Schoner, Fremont, CA (US); Chengfuh Jeffrey Tang, Saratoga, CA (US); Chuck Monahan, Mountain View, CA (US); Darren D. Neuman, Palo Alto, CA (US); David Chao Hua Wu, San Diego, CA (US); Francis Cheung, Del Mar, CA (US); Greg A. Kranawetter, Laguna Hills, CA (US); Hoang Nhu, Irvine, CA (US); Hsien-Chih Jim Tseng, San Jose, CA (US); Iue-Shuenn Chen, San Diego, CA (US); James D. Sweet, Sunnyvale, CA (US); Jeffrey S. Bauch, Alpharetta, GA (US); Keith LaRell Klinger, San Diego, CA (US); Patrick Law, Cupertino, CA (US); Rajesh Mamidwar, San Diego, CA (US); Dan Simon, San Diego, CA (US); Sang Van Tran, Encinitas, CA (US); Shawn V. Johnson, Laguna Hill, CA (US); Steven T. Jaffe, Irvine, CA (US); Thu T. Nguyen, San Jose, CA (US); Ut Nguyen, San Diego, CA (US); Yao-Hua Steven Tseng, Fremont, CA (US); Brad Delanghe, Sunnyvale, CA (US); Ben Giese, Oceanside, CA (US); Jason Demas, Irvine, CA (US); Lakshman Ramakrishnan, Banglore (IN); Sandeep Bhatia, Bangalore (IN); Guang-Ting Shih, San Jose, CA (US); Tracy C. Denk, Aliso Viejo, CA (US)

(73) Assignee: Broadcom Corporation, Irvine, CA (US)

(*) Notice: Subject to any disclaimer, the term of this patent is extended or adjusted under 35 U.S.C. 154(b) by 74 days.

This patent is subject to a terminal disclaimer.

(21) Appl. No.: 12/367,425

(22) Filed: Feb. 6, 2009

(65) Prior Publication Data

US 2009/0190656 A1    Jul. 30, 2009

Related U.S. Application Data

(63) Continuation of application No. 10/791,686, filed on Mar. 3, 2004, now Pat. No. 7,489,362, and a
(Continued)

(51) Int. Cl.
*H04N 5/44* (2006.01)
*H04N 3/27* (2006.01)

(52) U.S. Cl. ...................................... 348/554; 348/725

(58) Field of Classification Search .......... 348/552–554, 348/725, 726, 731, 589, 600; 725/67, 68, 725/85, 100, 131, 139, 151; *H04N 5/44, H04N 5/50, 3/27, 7/00, 11/00, 5/455*
See application file for complete search history.

(56) References Cited

U.S. PATENT DOCUMENTS 4,300,207 A    11/1981    Eivers et al.
(Continued)

FOREIGN PATENT DOCUMENTS

EP    1 244 007 A2    9/2002
(Continued)

OTHER PUBLICATIONS

Non-Final Office Action dated Apr. 20, 2006, issued in U.S. Appl. No. 10/646,721, filed Aug. 25, 2003, 6 pgs.
(Continued)

*Primary Examiner* — Sherrie Hsia
(74) *Attorney, Agent, or Firm* — Sterne Kessler Goldstein & Fox, P.L.L.C.

(57) ABSTRACT

A television on a chip (TVOC) system that provides a cost effective approach for providing television functionality on a single integrated circuit chip is disclosed. A TVOC includes the functionality necessary to receive and display television signals in a variety of input and output formats. A TVOC can be used in set-top boxes for cable and satellite television, or directly within a television. All functionality provided can be provided on a single integrated circuit. TVOC includes a data transport module, an IF demodulator, a digital audio engine, an analog audio engine, a digital video engine, and an analog video engine. The TVOC also includes three sets of interfaces including output interfaces, control interfaces and ancillary interfaces. Further features and embodiments provide enhanced functionality and increased efficiencies.

17 Claims, 18 Drawing Sheets

Related U.S. Application Data continuation-in-part of application No. 10/640,686, filed on Aug. 14, 2003, now Pat. No. 7,089,471, and a continuation-in-part of application No. 10/640,666, filed on Aug. 14, 2003, now Pat. No. 7,535,476, and a continuation-in-part of application No. 10/641,031, filed on Aug. 15, 2003, now Pat. No. 7,679,629, and a continuation-in-part of application No. 10/640,632, filed on Aug. 14, 2003, now Pat. No. 7,260,166, and a continuation-in-part of application No. 10/640,649, filed on Aug. 14, 2003, now Pat. No. 7,532,648, and a continuation-in-part of application No. 10/641,103, filed on Aug. 15, 2003, now Pat. No. 7,263,627, and a continuation-in-part of application No. 10/640,648, filed on Aug. 14, 2003, now Pat. No. 7,715,482, and a continuation-in-part of application No. 10/640,627, filed on Aug. 14, 2003, now Pat. No. 7,555,125, and a continuation-in-part of application No. 10/641,160, filed on Aug. 15, 2003, now Pat. No. 7,688,387, and a continuation-in-part of application No. 10/629,797, filed on Jul. 30, 2003, now abandoned, and a continuation-in-part of application No. 10/641,295, filed on Aug. 15, 2003, now abandoned, and a continuation-in-part of application No. 10/640,682, filed on Aug. 14, 2003, now Pat. No. 7,450,617, and a continuation-in-part of application No. 10/640,684, filed on Aug. 14, 2003, now Pat. No. 7,561,597, and a continuation-in-part of application No. 10/641,004, filed on Aug. 15, 2003, now Pat. No. 7,457,420, and a continuation-in-part of application No. 10/641,161, filed on Aug. 15, 2003, now abandoned, and a continuation-in-part of application No. 10/646,833, filed on Aug. 25, 2003, now Pat. No. 7,764,671, and a continuation-in-part of application No. 10/646,721, filed on Aug. 25, 2003, now abandoned, and a continuation-in-part of application No. 10/641,034, filed on Aug. 15, 2003, now Pat. No. 7,409,339, and a continuation-in-part of application No. 10/448,062, filed on May 30, 2003, now Pat. No. 7,239,357, and a continuation-in-part of application No. 10/629,781, filed on Jul. 30, 2003, now Pat. No. 7,102,689, and a continuation-in-part of application No. 10/640,687, filed on Aug. 14, 2003, now Pat. No. 7,131,054, and a continuation-in-part of application No. 10/640,659, filed on Aug. 14, 2003, now Pat. No. 7,058,868.

(60) Provisional application No. 60/451,265, filed on Mar. 4, 2003, provisional application No. 60/467,574, filed on May 5, 2003, provisional application No. 60/495,129, filed on Aug. 15, 2003, provisional application No. 60/495,127, filed on Aug. 15, 2003, provisional application No. 60/495,121, filed on Aug. 15, 2003.

(56) References Cited

U.S. PATENT DOCUMENTS

| | | |
|---|---|---|
| 4,368,354 A | 1/1983 | Furihata et al. |
| 4,399,329 A | 8/1983 | Wharton |
| 4,419,746 A | 12/1983 | Hunter et al. |
| 4,486,897 A | 12/1984 | Nagai |
| 4,493,077 A | 1/1985 | Agrawal et al. |
| 4,502,078 A | 2/1985 | Steckler et al. |
| 4,506,228 A | 3/1985 | Kammeyer |
| 4,521,858 A | 6/1985 | Kraemer et al. |
| 4,532,587 A | 7/1985 | Roskell et al. |
| 4,534,054 A | 8/1985 | Maisel |
| 4,577,157 A | 3/1986 | Reed |
| 4,623,926 A | 11/1986 | Sakamoto |
| 4,628,539 A | 12/1986 | Selwa |
| 4,656,651 A | 4/1987 | Evans et al. |
| 4,712,131 A | 12/1987 | Tanabe |
| 4,716,589 A | 12/1987 | Matsui |
| 4,747,140 A | 5/1988 | Gibson |
| 4,803,700 A | 2/1989 | Dewey et al. |
| 4,862,099 A | 8/1989 | Nakai et al. |
| 4,893,316 A | 1/1990 | Janc et al. |
| 4,918,531 A | 4/1990 | Johnson |
| 4,996,597 A | 2/1991 | Duffield |
| 5,031,233 A | 7/1991 | Ragan |
| 5,134,691 A | 7/1992 | Elms |
| 5,151,926 A | 9/1992 | Chennakeshu et al. |
| 5,227,863 A | 7/1993 | Bilbrey et al. |
| 5,235,600 A | 8/1993 | Edwards |
| 5,271,023 A | 12/1993 | Norman |
| 5,283,903 A | 2/1994 | Uehara |
| 5,337,196 A | 8/1994 | Kim |
| 5,404,405 A | 4/1995 | Collier et al. |
| 5,428,404 A | 6/1995 | Ingram et al. |
| 5,440,269 A | 8/1995 | Hwang |
| 5,467,342 A | 11/1995 | Logston et al. |
| 5,471,411 A | 11/1995 | Adams et al. |
| 5,473,768 A | 12/1995 | Kimura |
| 5,491,787 A | 2/1996 | Hashemi |
| 5,500,851 A | 3/1996 | Kozaki et al. |
| 5,519,443 A | 5/1996 | Salomon et al. |
| 5,524,244 A | 6/1996 | Robinson et al. |
| 5,557,608 A | 9/1996 | Calvignac et al. |
| 5,570,137 A | 10/1996 | Goeckler |
| 5,572,663 A | 11/1996 | Hosaka |
| 5,596,767 A | 1/1997 | Guttag et al. |
| 5,614,862 A | 3/1997 | Sun |
| 5,621,651 A | 4/1997 | Swoboda |
| 5,640,388 A | 6/1997 | Woodhead et al. |
| 5,644,677 A | 7/1997 | Park et al. |
| 5,687,344 A | 11/1997 | Mitsuishi et al. |
| 5,694,588 A | 12/1997 | Ohara et al. |
| 5,708,961 A | 1/1998 | Hylton et al. |
| 5,715,012 A | 2/1998 | Patel et al. |
| 5,732,107 A | 3/1998 | Phillips et al. |
| 5,737,035 A | 4/1998 | Rotzoll |
| 5,748,860 A | 5/1998 | Shively |
| 5,781,774 A | 7/1998 | Krick |
| 5,790,873 A | 8/1998 | Popper et al. |
| 5,805,222 A | 9/1998 | Nakagawa et al. |
| 5,812,562 A | 9/1998 | Baeg |
| 5,826,072 A | 10/1998 | Knapp et al. |
| 5,828,415 A | 10/1998 | Keating et al. |
| 5,841,670 A | 11/1998 | Swoboda |
| 5,847,612 A | 12/1998 | Birleson |
| 5,859,442 A | 1/1999 | Manning |
| 5,878,264 A | 3/1999 | Ebrahim |
| 5,889,820 A | 3/1999 | Adams |
| 5,896,454 A | 4/1999 | Cookson et al. |
| 5,905,405 A | 5/1999 | Ishizawa |
| 5,909,255 A | 6/1999 | Hatano |
| 5,909,369 A | 6/1999 | Gopinath et al. |
| 5,931,934 A | 8/1999 | Li et al. |
| 5,936,968 A | 8/1999 | Lyons |
| 5,949,821 A | 9/1999 | Emami et al. |
| 5,956,494 A | 9/1999 | Girardeau et al. |
| 5,968,140 A | 10/1999 | Hall |
| 5,987,078 A | 11/1999 | Kiyanagi et al. |
| 6,002,726 A | 12/1999 | Simanapalli et al. |
| 6,005,640 A | 12/1999 | Strolle et al. |
| 6,006,287 A | 12/1999 | Wakazu |
| 6,035,094 A | 3/2000 | Kori |
| 6,037,993 A | 3/2000 | Easley |
| 6,064,676 A | 5/2000 | Slattery et al. |
| 6,065,112 A | 5/2000 | Kishida et al. |
| 6,071,314 A | 6/2000 | Baxter et al. |
| 6,078,617 A | 6/2000 | Nakagawa et al. |
| 6,101,319 A | 8/2000 | Hall |
| 6,112,170 A | 8/2000 | Patwardhan et al. |
| 6,115,432 A | 9/2000 | Mishima et al. |
| 6,133,964 A | 10/2000 | Han |

| | | | | | | |
|---|---|---|---|---|---|---|
| 6,147,713 | A | 11/2000 | Robbins et al. | 6,963,623 B2 | 11/2005 | Ninomiya et al. |
| 6,151,367 | A | 11/2000 | Lim | 6,967,951 B2 | 11/2005 | Alfano |
| 6,154,483 | A | 11/2000 | Davidovici et al. | 6,972,632 B2 | 12/2005 | Akahori |
| 6,163,684 | A | 12/2000 | Birleson | 6,987,767 B2 | 1/2006 | Saito |
| 6,177,964 | B1 | 1/2001 | Birleson et al. | 6,999,130 B2 | 2/2006 | Tanigawa |
| 6,189,064 | B1 | 2/2001 | MacInnis et al. | 7,006,756 B1 | 2/2006 | Keesen et al. |
| 6,195,392 | B1 | 2/2001 | O'Grady | 7,006,806 B2 | 2/2006 | Wu et al. |
| 6,199,182 | B1 | 3/2001 | Whetsel | 7,010,665 B1 | 3/2006 | Toll et al. |
| 6,205,223 | B1 | 3/2001 | Rao et al. | 7,031,306 B2 | 4/2006 | Amaral et al. |
| 6,208,162 | B1 | 3/2001 | Bocchino | 7,039,941 B1 | 5/2006 | Caporizzo et al. |
| RE37,195 | E | 5/2001 | Kean | 7,057,627 B2 | 6/2006 | MacInnis et al. |
| 6,233,295 | B1 | 5/2001 | Wang | 7,058,868 B2 | 6/2006 | Guettaf |
| 6,275,507 | B1 | 8/2001 | Anderson et al. | 7,079,657 B2 | 7/2006 | Wu et al. |
| 6,281,813 | B1 | 8/2001 | Vierthaler et al. | 7,088,398 B1 | 8/2006 | Wolf et al. |
| 6,292,490 | B1 | 9/2001 | Gratacap et al. | 7,089,471 B2 | 8/2006 | Guettaf |
| 6,314,504 | B1 | 11/2001 | Dent | 7,098,967 B2 | 8/2006 | Kanno et al. |
| 6,334,026 | B1 | 12/2001 | Xue et al. | 7,102,689 B2 | 9/2006 | Grossman et al. |
| 6,337,878 | B1 | 1/2002 | Endres et al. | 7,106,388 B2 | 9/2006 | Vorenkamp et al. |
| 6,356,598 | B1 | 3/2002 | Wang | 7,119,856 B2 | 10/2006 | Huang et al. |
| 6,363,126 | B1 | 3/2002 | Furukawa et al. | 7,131,045 B2 | 10/2006 | Guettaf |
| 6,369,857 | B1 | 4/2002 | Balaban et al. | 7,139,283 B2 | 11/2006 | Quigley et al. |
| 6,370,191 | B1 | 4/2002 | Mahant-Shetti et al. | 7,151,945 B2 | 12/2006 | Myles et al. |
| 6,373,530 | B1 | 4/2002 | Birks et al. | 7,167,215 B2 | 1/2007 | Markman et al. |
| 6,378,093 | B1 | 4/2002 | Whetsel | 7,227,587 B2 | 6/2007 | MacInnis et al. |
| 6,381,747 | B1 | 4/2002 | Wonfor et al. | 7,230,987 B2 | 6/2007 | Demas et al. |
| 6,430,681 | B1 | 8/2002 | Nagao | 7,239,357 B2 | 7/2007 | Jaffe |
| 6,438,368 | B1 | 8/2002 | Phillips et al. | 7,253,753 B2 | 8/2007 | Wu et al. |
| 6,445,726 | B1 | 9/2002 | Gharpurey | 7,260,166 B2 | 8/2007 | Sweet |
| 6,452,435 | B1 | 9/2002 | Skergan et al. | 7,263,627 B2 | 8/2007 | Sweet et al. |
| 6,463,452 | B1 | 10/2002 | Schulist et al. | 7,272,197 B2 | 9/2007 | Hwang |
| 6,476,878 | B1 | 11/2002 | Lafay et al. | 7,304,688 B1 | 12/2007 | Woodall |
| 6,487,466 | B1 | 11/2002 | Miyabe | 7,307,667 B1 | 12/2007 | Yeh et al. |
| 6,492,913 | B2 | 12/2002 | Vierthaler et al. | 7,352,411 B2 | 4/2008 | Jaffe |
| 6,512,555 | B1 | 1/2003 | Patel et al. | 7,397,822 B2 | 7/2008 | Golan et al. |
| 6,539,497 | B2 | 3/2003 | Swoboda et al. | 7,403,579 B2 | 7/2008 | Jaffe et al. |
| 6,542,203 | B1 | 4/2003 | Shadwell et al. | 7,409,339 B2 | 8/2008 | Nhu |
| 6,542,725 | B2 | 4/2003 | Armbruster et al. | 7,450,617 B2 | 11/2008 | Cheung et al. |
| 6,545,723 | B1 | 4/2003 | Han | 7,457,420 B2 | 11/2008 | Nhu |
| 6,545,728 | B1 | 4/2003 | Patel et al. | 7,461,282 B2 | 12/2008 | Cheung et al. |
| 6,559,898 | B1 | 5/2003 | Citta et al. | 7,477,326 B2 | 1/2009 | Jaffe |
| 6,570,990 | B1 | 5/2003 | Kohn et al. | 7,489,362 B2 | 2/2009 | Baer et al. |
| 6,584,560 | B1 | 6/2003 | Kroun et al. | 7,532,648 B2 | 5/2009 | Sweet |
| 6,584,571 | B1 | 6/2003 | Fung | 7,535,476 B2 | 5/2009 | Tang et al. |
| 6,611,571 | B1 | 8/2003 | Nakajima | 7,555,125 B2 | 6/2009 | Grossman et al. |
| 6,636,270 | B2 | 10/2003 | Gates et al. | 7,561,597 B2 | 7/2009 | Cheung et al. |
| 6,639,422 | B1 | 10/2003 | Albean | 7,650,125 B2 | 1/2010 | Wu et al. |
| 6,646,460 | B2 | 11/2003 | Whetsel | 7,679,629 B2 | 3/2010 | Neuman et al. |
| 6,665,802 | B1 | 12/2003 | Ober | 7,688,387 B2 | 3/2010 | Johnson |
| 6,674,488 | B1 | 1/2004 | Satoh | 7,715,482 B2 | 5/2010 | Kranawetter et al. |
| 6,678,011 | B2 | 1/2004 | Yanagi et al. | 7,764,671 B2 | 7/2010 | Tran et al. |
| 6,680,955 | B1 | 1/2004 | Le | 7,834,937 B2 | 11/2010 | Jaffe |
| 6,687,670 | B2 | 2/2004 | Sydanmaa et al. | 7,835,400 B2 | 11/2010 | Cheung et al. |
| 6,697,382 | B1 | 2/2004 | Eatherton | 2001/0009547 A1 | 7/2001 | Jinzaki et al. |
| 6,707,861 | B1 | 3/2004 | Stewart | 2002/0091861 A1 | 7/2002 | Kim et al. |
| 6,725,357 | B1 | 4/2004 | Cousin | 2002/0122430 A1 | 9/2002 | Haberman et al. |
| 6,738,097 | B2 | 5/2004 | Satoh | 2002/0186223 A1 | 12/2002 | Sasaki |
| 6,738,098 | B1 | 5/2004 | Hutchinson | 2003/0028743 A1 | 2/2003 | Catherwood et al. |
| 6,760,076 | B2 | 7/2004 | Wittig | 2003/0085993 A1 | 5/2003 | Trimbee et al. |
| 6,760,866 | B2 | 7/2004 | Swoboda et al. | 2003/0086695 A1 | 5/2003 | Okamoto et al. |
| 6,771,707 | B1 | 8/2004 | Limberg | 2003/0161477 A1 | 8/2003 | Wu et al. |
| 6,772,022 | B1 | 8/2004 | Farrow et al. | 2003/0161486 A1 | 8/2003 | Wu et al. |
| 6,779,098 | B2 | 8/2004 | Sato et al. | 2003/0162500 A1 | 8/2003 | Wu et al. |
| 6,789,183 | B1 | 9/2004 | Smith et al. | 2003/0165084 A1 | 9/2003 | Blair et al. |
| 6,791,995 | B1 | 9/2004 | Azenkot et al. | 2003/0174770 A1 | 9/2003 | Kato et al. |
| 6,801,544 | B1 | 10/2004 | Rijckaert et al. | 2003/0190157 A1 | 10/2003 | Aubry et al. |
| 6,810,084 | B1 | 10/2004 | Jun et al. | 2003/0197810 A1 | 10/2003 | Jaffe |
| 6,819,331 | B2 | 11/2004 | Shih et al. | 2003/0198352 A1 | 10/2003 | Easley et al. |
| 6,823,131 | B2 | 11/2004 | Abelard et al. | 2003/0215215 A1 | 11/2003 | Imahashi et al. |
| 6,826,352 | B1 | 11/2004 | Quan | 2004/0008661 A1 | 1/2004 | Myles et al. |
| 6,832,078 | B2 | 12/2004 | Wu | 2004/0090976 A1 | 5/2004 | Shung |
| 6,859,238 | B2 | 2/2005 | Wu | 2004/0105658 A1 | 6/2004 | Hallberg et al. |
| 6,861,867 | B2 | 3/2005 | West et al. | 2004/0128578 A1 | 7/2004 | Jonnalagadda |
| 6,868,131 | B2 | 3/2005 | Ohishi | 2004/0170162 A1 | 9/2004 | Hung |
| 6,879,647 | B1 | 4/2005 | Myers | 2004/0170199 A1 | 9/2004 | Golan et al. |
| 6,924,848 | B2 | 8/2005 | Onomatsu | 2004/0223086 A1 | 11/2004 | Jaffe |
| 6,937,671 | B2 | 8/2005 | Samarasooriya | 2005/0027771 A1 | 2/2005 | Wu |
| 6,944,226 | B1 | 9/2005 | Lin et al. | 2005/0035887 A1 | 2/2005 | Nhu |
| 6,957,284 | B2 | 10/2005 | Voth et al. | 2005/0035975 A1 | 2/2005 | Tang et al. |
| 6,959,151 | B1 | 10/2005 | Cotter et al. | 2005/0036037 A1 | 2/2005 | Kranawetter et al. |

| | | | |
|---|---|---|---|
| 2005/0036070 A1 | 2/2005 | Johnson | |
| 2005/0036074 A1 | 2/2005 | Nhu | |
| 2005/0036357 A1 | 2/2005 | Nhu et al. | |
| 2005/0036508 A1 | 2/2005 | Tran et al. | |
| 2005/0036515 A1 | 2/2005 | Cheung et al. | |
| 2005/0036516 A1 | 2/2005 | Cheung et al. | |
| 2005/0036523 A1 | 2/2005 | Sweet | |
| 2005/0036626 A1 | 2/2005 | Nhu | |
| 2005/0036764 A1 | 2/2005 | Grossman et al. | |
| 2005/0039065 A1 | 2/2005 | Cheung et al. | |
| 2005/0039204 A1 | 2/2005 | Neuman et al. | |
| 2005/0047603 A1 | 3/2005 | Nhu | |
| 2005/0280742 A1 | 12/2005 | Jaffe | |
| 2006/0062254 A1 | 3/2006 | Markevitch et al. | |
| 2006/0079197 A1 | 4/2006 | Wu et al. | |
| 2006/0171659 A1 | 8/2006 | Worrell et al. | |
| 2007/0105504 A1 | 5/2007 | Vorenkamp et al. | |
| 2008/0180578 A1 | 7/2008 | Jaffe | |
| 2009/0043571 A1 | 2/2009 | Nhu | |
| 2009/0074383 A1 | 3/2009 | Cheung et al. | |
| 2010/0182504 A1 | 7/2010 | Kranawetter et al. | |

FOREIGN PATENT DOCUMENTS

| | | |
|---|---|---|
| JP | H06-324669 | 11/1994 |
| JP | 2000-004122 A | 1/2000 |
| JP | 2001-197398 A | 7/2001 |
| KR | 10-2000-0060826 | 10/2000 |
| KR | 10-2001-0033892 | 4/2001 |
| WO | WO 03/061216 A1 | 7/2003 |

OTHER PUBLICATIONS

Final Office Action dated Dec. 29, 2006, issued in U.S. Appl. No. 10/646,721, filed Aug. 25, 2003, 7 pgs.
Non-Final Office Action dated Jul. 27, 2007, issued in U.S. Appl. No. 10/646,721, filed Aug. 25, 2003, 6 pgs.
Cirrus Logic,"96 kHz Digital Audio Interface Transmitter: Data Sheet CS8405A", Nov. 1999, 33 pages.
Sanchez, C. & Taylor, R., Overview of Digital Audio Interface Data Structures: Application Note AN22, Cirrus Logic, Feb. 1998, 10 pages.
European Search Report, dated Mar. 10, 2005, for European Patent Application No. 04017519.2, 3 pages.
European Search Report, dated Oct. 29, 2004, for European Patent Application No. 04017521.8, 3 pages.
Auto Codec '97 for portable computing: Preliminary Product Information CS4205, Feb. 2001, Cirrus Logic, entire document.
Park, S., "A Real-Time Method for Sample-Rate Conversion from CD to DAT", ICCE 90, IEEE 1990 Conference on Consumer Electronics, Jun. 1990, pp. 360-361.
Non-Final Office Action dated Jul. 9, 2007, issued in U.S. Appl. No. 10/646,833, filed Aug. 25, 2003, 15 pgs.
Final Office Action dated Oct. 31, 2007, issued in U.S. Appl. No. 10/646,833, filed Aug. 25, 2003, 19 pgs.
Non-Final Office Action dated Mar. 26, 2008, issued in U.S. Appl. No. 10/646,833, filed Aug. 25, 2003, 19 pgs.
Final Office Action dated Dec. 10, 2008, issued in U.S. Appl. No. 10/646,833, filed Aug. 25, 2003, 16 pgs.
Non-Final Office Action dated Sep. 20, 2007, issued in U.S. Patent Application No. 10/641,031, filed Aug. 15, 2003, 16 pgs.
Final Office Action dated May 1, 2008, issued in U.S. Appl. No. 10/641,031, filed Aug. 15, 2003, 22 pgs.
Non-Final Office Action dated Dec. 5, 2008, issued in U.S. Appl. No. 10/641,031, filed Aug. 15, 2003, 18 pgs.
Non-Final Office Action dated Mar. 22, 2007, issued in U.S. Appl. No. 10/641,161, filed Aug. 15, 2003, 14 pgs.
Non-Final Office Action dated Sep. 18, 2009, issued in U.S. Appl. No. 10/641,161, filed Aug. 15, 2003, 15 pgs.
Final Office Action dated Jan. 16, 2009, issued in U.S. Appl. No. 10/641,161, filed Aug. 15, 2003, 17 pgs.
Final Office Action dated Oct. 16, 2007, issued in U.S. Appl. No. 10/641,161, filed Aug. 15, 2003, 14 pgs.
Non-Final Office Action dated Jun. 28, 2007, issued in U.S. Appl. No. 10/641,160, filed Aug. 15, 2003, 8 pgs.
Final Office Action dated Jan. 8, 2008, issued in U.S. Appl. No. 10/641,160, filed Aug. 15, 2003, 9 pgs.
Non-Final Office Action dated Oct. 12, 2005, issued in U.S. Appl. No. 10/641,295, filed Aug. 15, 2003, 18 pgs.
Final Office Action dated Feb. 15, 2006, issued in U.S. Appl. No. 10/641,295, filed Aug. 15, 2003, 18 pgs.
Non-Final Office Action dated Dec. 22, 2008, issued in U.S. Appl. No. 10/641,295, filed Aug. 15, 2003, 22 pgs.
Non-Final Office Action dated Aug. 11, 2006, issued in U.S. Appl. No. 10/641,295, filed Aug. 15, 2003, 15 pgs.
Final Office Action dated Feb. 1, 2007, issued in U.S. Appl. No. 10/641,295, filed Aug. 15, 2003, 17 pgs.
Non-Final Office Action dated Aug. 28, 2007, issued in U.S. Appl. No. 10/641,295, filed Aug. 15, 2003, 20 pgs.
Non-Final Office Action dated Oct. 29, 2007, issued in U.S. Appl. No. 10/640,682, filed Aug. 14, 2003, 6 pgs.
Final Office Action dated Jun. 3, 2008, issued in U.S. Appl. No. 10/641,295, filed Aug. 14, 2003, 20 pgs.
Final Office Action dated Apr. 9, 2008, issued in U.S. Appl. No. 10/640,682, filed Aug. 14, 2003, 6 pgs.
Final Office Action dated Jul. 23, 2007, issued in U.S. Appl. No. 10/640,682, filed Aug. 14, 2003, 5 pgs.
Non-Final Office Action dated Jul. 29, 2008, issued in U.S. Appl. No. 10/640,684, filed Aug. 14, 2003, 9 pgs.
Non-Final Office Action dated Apr. 8, 2007, issued in U.S. Appl. No. 10/640,684, filed Aug. 14, 2003, 10 pgs.
Non-Final Office Action dated Aug. 15, 2007, issued in U.S. Appl. No. 10/640,684, filed Aug. 14, 2003, 10 pgs.
Non-Final Office Action dated Nov. 27, 2007, issued in U.S. Appl. No. 10/640,684, filed Aug. 14, 2003, 8 pgs.
Final Office Action dated Dec. 2, 2008, issued in U.S. Appl. No. 10/640,684, filed Aug. 14, 2003, 9 pgs.
Final Office Action dated Apr. 22, 2008, issued in U.S. Appl. No. 10/640,684, filed Aug. 14, 2003, 10 pgs.
Non-Final Office Action dated Oct. 7, 2008, issued in U.S. Appl. No. 10/640,666, filed Aug. 14, 2003, 11 pgs.
Non-Final Office Action dated May 18, 2005, issued in U.S. Appl. No. 10/640,666, filed Aug. 14, 2003, 11 pgs.
Final Office Action dated Dec. 12, 2005, issued in U.S. Appl. No. 10/640,666, filed Aug. 14, 2003, 10 pgs.
Non-Final Office Action dated May 15, 2006, issued in U.S. Appl. No. 10/640,666, filed Aug. 14, 2003, 8 pgs.
Final Office Action dated Oct. 23, 2006, issued in U.S. Appl. No. 10/640,666, filed Aug. 14, 2003, 10 pgs.
Non-Final Office Action dated Apr. 20, 2007, issued in U.S. Appl. No. 10/640,666, filed Aug. 14, 2003, 12 pgs.
Final Office Action dated Aug. 16, 2007, issued in U.S. Appl. No. 10/640,666, filed Aug. 14, 2003, 12 pgs.
Non-Final Office Action dated Nov. 14, 2007, issued in U.S. Appl. No. 10/640,666, filed Aug. 14, 2003, 11 pgs.
Final Office Action dated Mar. 26, 2008, issued in U.S. Appl. No. 10/640,666, filed Aug. 14, 2003, 13 pgs.
Non-Final Office Action dated Jun. 26, 2007, issued in U.S. Appl. No. 10/640,649, filed Aug. 14, 2003.
Non-Final Office Action dated Oct. 23, 2007, issued in U.S. Appl. No. 10/640,649, filed Aug. 14, 2003.
Final Office Action dated Feb. 20, 2008, issued in U.S. Appl. No. 10/640,649, filed Aug. 14, 2003.
Non-Final Office Action dated May 17, 2007, issued in U.S. Appl. No. 10/640,648, filed Aug. 14, 2003, 12 pgs.
Non-Final Office Action dated Jan. 22, 2009, issued in U.S. Appl. No. 10/640,648, filed Aug. 14, 2003, 19 pgs.
Final Office Action dated Oct. 12, 2007, issued in U.S. Appl. No. 10/640,648, filed Aug. 14, 2003, 14 pgs.
Final Office Action dated Sep. 3, 2008, issued in U.S. Appl. No. 10/640,648, filed Aug. 14, 2003, 16 pgs.
Non-Final Office Action dated Mar. 27, 2008, issued in U.S. Appl. No. 10/640,648, filed Aug. 14, 2003, 17 pgs.
Non-Final Office Action dated Jul. 28, 2006, issued in U.S. Appl. No. 10/629,797, filed Jul. 30, 2003, 10 pgs.
Non-Final Office Action dated Apr. 1, 2009, issued in U.S. Appl. No. 10/629,797, filed Jul. 30, 2003, 9 pgs.

Non-Final Office Action dated Aug. 15, 2008, issued in U.S. Appl. No. 10/629,797, filed Jul. 30, 2003, 9 pgs.
Final Office Action dated Jan. 25, 2007, issued in U.S. Appl. No. 10/629,797, filed Jul. 30, 2003, 6 pgs.
Final Office Action dated Dec. 9, 2008, issued in U.S. Appl. No. 10/629,797, filed Jul. 30, 2003, 10 pgs.
Non-Final Office Action dated Aug. 25, 2004, issued in U.S. Appl. No. 10/448,062, filed May 30, 2003, 19 pgs.
Final Office Action dated May 19, 2005, issued in U.S. Appl. No. 10/448,062, filed May 30, 2003, 19 pgs.
Non-Final Office Action dated Feb. 10, 2006, issued in U.S. Appl. No. 10/448,062, filed May 30, 2003, 19 pgs.
Final Office Action dated Sep. 6, 2006, issued in U.S. Appl. No. 10/448,062, filed May 30, 2003, 20 pgs.
Non-Final Office Action dated Jul. 5, 2007, issued in U.S. Appl. No. 10/641,004, filed Aug. 15, 2003, 9 pgs.
Final Office Action dated Jan. 25, 2008, issued in U.S. Appl. No. 10/641,004, filed Aug. 15, 2003, 8 pgs.
Non-Final Office Action dated Mar. 29, 2007, issued in U.S. Appl. No. 10/641,034, filed Aug. 15, 2003, 8 pgs.
Final Office Action dated Sep. 13, 2007, issued in U.S. Appl. No. 10/641,034, filed Aug. 15, 2003, 9 pgs.
Non-Final Office Action dated Mar. 1, 2007, issued in U.S. Appl. No. 10/640,627, filed Aug. 15, 2003, 10 pgs.
Non-Final Office Action dated Nov. 17, 2008, issued in U.S. Appl. No. 10/640,627, filed Aug. 15, 2003, 9 pgs.
Final Office Action dated Aug. 31, 2007, issued in U.S. Appl. No. 10/640,627, filed Aug. 15, 2003, 10 pgs.
Poole, S., Surface, G., Singh, B., Dyer, N., "A CMOS Subscriber Line Audio Audio Processing Circuit Including Adaptive Balance," IEEE International Symposium on Circuits and Systems, Finland, Espoo, vol. 2 of 3, Jun. 7-9, 1988, pp. 1931-1934.
Non-Final Office Action dated Aug. 23, 2006, issued in U.S. Appl. No. 10/848,160, filed May 19, 2004, 8 pgs.
Final Office Action dated May 21, 2007, issued in U.S. Appl. No. 10/848,160, filed May 19, 2004, 10 pgs.
Non-Final Office Action dated Jan. 8, 2008, issued in U.S. Appl. No. 10/848,160, filed May 19, 2004, 10 pgs.
Non-Final Office Action Dated Jul. 17, 2008, issued in U.S. Appl. No. 10/640,649, filed Aug. 14, 2003, 8 pgs.
Non-Final Office Action Dated Oct. 23, 2007, issued in U.S. Appl. No. 10/640,649, filed Aug. 14, 2003, 9 pgs.
Stallings, William. "Computer Organization and Architecture 6th Edition," 2003, Prentice Hall, Chpt. 11.
Non-Final Office Action dated May 14, 2008, issued in U.S. Appl. No. 10/641,160, filed Aug. 15, 2003, 7 pgs.
Final Office Action dated Jan. 7, 2009, issued in U.S. Appl. No. 10/641,160, filed Aug. 15, 2003, 9 pgs.
Non-Final Office Action dated Feb. 25, 2008, issued in U.S. Appl. No. 10/791,686, filed Mar. 3, 2004, 10 pgs.
Non-Final Office Action dated Oct. 27, 2006, issued in U.S. Appl. No. 10/641,103, filed Aug. 15, 2003, 14 pgs.
Non-Final Office Action dated Jan. 12, 2006, issued in U.S. Appl. No. 10/641,103, filed Aug. 15, 2003, 17 pgs.
Final Office Action dated Jun. 1, 2006, issued in U.S. Appl. No. 10/641,103, filed Aug. 15, 2003, 11 pgs.
Non-Final Office Action dated Oct. 31, 2006, issued in U.S. Appl. No. 10/640, 632, filed Aug. 14, 2003, 11 pgs.
Non-Final Office Action dated Nov. 29, 2005, issued in U.S. Appl. No. 10/640, 659, filed Aug. 14, 2003, 6 pgs.
Non-Final Office Action dated Feb. 27, 2006, issued in U.S. Appl. No. 10/640, 687, filed Aug. 14, 2003, 6 pgs.
Non-Final Office Action dated Dec. 2, 2005, issued in U.S. Appl. No. 10/640, 686, filed Aug. 14, 2003, 7 pgs.
Generic Coding of Moving Pictures and Associated Audio: Systems, Recommendation H.22.0 (ISO/IEC 13818-1); ISO/IEC JTC1/SC29/WG11 N0801, Nov. 13, 1994, entire document.
English language abstract for JP 2000-004122, published Jan. 7, 2000, 1 page, data supplied from the espacenet database.
English language abstract for JP 2001-197398, published Jul. 19, 2001, 1 page, data supplied from the espacenet database.
Non-Final Office Action dated Jul. 31, 2003, issued in U.S. Appl. No. 09/739,349, filed Dec. 15, 2000, 6 pages.
Notice of Allowance dated Feb. 24, 2006, issued in U.S. Appl. No. 09/739,349, filed Dec. 15, 2000, 7 pages.
Non-Final Office Action dated Nov. 3, 2004, issued in U.S. Appl. No. 10/083,076, filed Feb. 26, 2002, 11 pages.
Final Office Action dated Jun. 6, 2005, issued in U.S. Appl. No. 10/083,076, filed Feb. 26, 2002, 12 pages.
Notice of Allowance dated Aug. 26, 2005, issued in U.S. Appl. No. 10/083,076, filed Feb. 26, 2002, 7 pages.
Notice of Allowance dated May 3, 2006, issued in U.S. Appl. No. 10/629,781,filed Jul. 30, 2003, 6 pages.
Final Office Action dated Jul. 7, 2009, issued in U.S. Appl. No. 10/629,797, filed Jul. 30, 2003, 11 pages.
Non-Final Office Action dated Dec. 10, 2009, issued in U.S. Appl. No. 10/629,797, filed Jul. 30, 2003. 10 pages.
Final Office Action dated Apr. 27, 2010, issued in U.S. Appl. No. 10/629,797, filed Jul. 30, 2003, 13 pages.
Notice of Allowance dated Apr. 17, 2007, issued in U.S. Appl. No. 10/640,632, filed Aug. 14, 2003, 8 pages.
Final Office Action dated Jun. 25, 2009, issued in U.S. Appl. No. 10/640,648, filed Aug. 14, 2003, 21 pages.
Notice of Allowance dated Dec. 23, 2009, issued in U.S. Appl. No. 10/640,648, filed Aug. 14, 2003, 6 pages.
Notice of Allowance dated Jan. 5, 2009, issued in U.S. Appl. No. 10/640,649, filed Aug. 14, 2003, 6 pages.
Notice of Allowance dated Jul. 24, 2008, issued in U.S. Appl. No. 10/640,682, filed Aug. 14, 2003, 6 pages.
Notice of Allowance dated Jul. 21, 2008, issued in U.S. Appl. No. 10/641,004, filed Aug. 15, 2003, 6 pages.
Notice of Allowance dated Oct. 26, 2009, issued in U.S. Appl. No. 10/641,031, filed Aug. 15, 2003, 5 pages.
Notice of Allowance dated Apr. 2, 2008, issued in U.S. Appl. No. 10/641,034, filed Aug. 15, 2003, 7 pages.
Notice of Allowance dated Apr. 24, 2007, issued in U.S. Appl. No. 10/641,103; filed Aug. 15, 2003, 10 pages.
Non-Final Office Action dated May 26, 2009, issued in U.S. Appl. No. 10/641,160, filed Aug. 15, 2003, 8 pages.
Non-Final Office Action dated Jul. 6, 2009, issued in U.S. Appl. No. 10/646,833, filed Aug. 25, 2003, 18 pages.
Final Office Action dated Jan. 11, 2010, issued in U.S. Appl. No. 10/646,833, filed Aug. 25, 2003, 25 pages.
Notice of Allowance dated May 17, 2010, issued in U.S. Appl. No. 10/646,833, filed Aug. 25, 2003, 10 pages.
Notice of Allowance dated Jul. 18, 2007, issued in U.S. Appl. No. 10/776,991, filed Feb. 12, 2004, 9 pages.
Notice of Allowance dated Nov. 6, 2007, issued in U.S. Appl. No. 10/776,991, filed Feb. 12, 2004, 6 pages.
Non-Final Office Action dated Jan. 24, 2006, issued in U.S. Appl. No. 11/197,735, filed Aug. 2, 2005, 7 pages.
Final Office Action dated Jun. 16, 2006, issued in U.S. Appl. No. 11/197,735, filed Aug. 2, 2005, 7 pages.
Non-Final Office Action dated Mar. 29, 2007, issued in U.S. Appl. No. 11/197,735, filed Aug. 2, 2005, 8 pages.
Final Office Action dated Sep. 21, 2007, issued in U.S. Appl. No. 11/197,735, filed Aug. 2, 2005, 9 pages.
Examiner's Answer dated Jun. 27, 2008, issued in U.S. Appl. No. 11/197,735, filed Aug. 2, 2005, 10 pages.
Non-Final Office Action dated Dec. 19, 2008, issued in U.S. Appl. No. 11/286,561, filed Nov. 23, 2005, 16 pages.
Notice of Allowance dated Sep. 21, 2009, issued in U.S. Appl. No. 11/286,561, filed Nov. 23, 2005, 8 pages.
Non-Final Office Action dated Feb. 19, 2010, issued in U.S. Appl. No. 11/516,718, filed Sep. 7, 2006, 11 pages.
Non-Final Office Action dated Jun. 23, 2009, issued in U.S. Appl. No. 12/076,849, filed Mar. 24, 2008, 11 pages.
Notice of Allowance dated Mar. 23, 2010, issued in U.S. Appl. No. 12/076,849, filed Mar. 24, 2008, 6 pages.
Notice of Allowance dated Jul. 9, 2010, issued in U.S. Appl. No. 12/076,849, filed Mar. 24, 2008, 6 pages.
Non-Final Office Action dated Sep. 17, 2010, issued in U.S. Appl. No. 12/185,638, filed Aug. 4, 2008, 5 pages.
Notice of Allowance dated Sep. 8, 2010, issued in U.S. Appl. No. 12/480,523, filed Jun. 9, 2009, 7 pages.

TELEVISION FUNCTIONALITY ON A CHIP

CROSS REFERENCE TO RELATED APPLICATIONS

This application is a continuation of U.S. patent application Ser. No. 10/791,686 filed Mar. 3, 2004, entitled "Television Functionality on a Chip" (the '686 application), which is incorporated by referenced herein in its entirety The '686 application claims the benefit of priority to the following U.S. Provisional Patent Applications: Application No. 60/451,265, filed Mar. 4, 2003; Application No. 60/467,574, filed May 5, 2003; Application No. 60/495,129, filed Aug. 15, 2003; Application No. 60/495,127, filed Aug. 15, 2003; and Application No. 60/495,121, filed Aug. 15, 2003; all of which are incorporated herein by reference in their entireties.

The '686 application is also a continuation in part of the following U.S. patent applications: application Ser. No. 10/448,062, filed May 30, 2003, now U.S. Pat. No. 7,239,357; application Ser. No. 10/629,781, filed Jul. 30, 2003, now U.S. Pat. No. 7,102,689; application Ser. No. 10/640,687, filed Aug. 14, 2003, now U.S. Pat. No. 7,131,045; application Ser. No. 10/640,659, filed Aug. 14, 2003, now U.S. Pat. No. 7,058,868; application Ser. No. 10/640,686, filed Aug. 14, 2003, now U.S. Pat. No. 7,089,471; application Ser. No. 10/640,666, filed Aug. 14, 2003; application Ser. No. 10/641,031, filed Aug. 15, 2003; application Ser. No. 10/640,632, filed Aug. 14, 2003, now U.S. Pat. No. 7,260,166; application Ser. No. 10/640,649, filed Aug. 14, 2003; application Ser. No. 10/641,103, filed Aug. 15, 2003, now U.S. Pat. No. 7,263,627; application Ser. No. 10/640,648, filed Aug. 14, 2003; application Ser. No. 10/640,627, filed Aug. 14, 2003; application Ser. No. 10/641,160, filed Aug. 15, 2003; application Ser. No. 10/629,797, filed Jul. 30, 2003; application Ser. No. 10/641,295, filed Aug. 15, 2003; application Ser. No. 10/640,682, filed Aug. 14, 2003, now U.S. Pat. No. 7,450,617; application Ser. No. 10/640,684, filed Aug. 14, 2003; application Ser. No. 10/641,004, filed Aug. 15, 2003, now U.S. Pat. No. 7,457,420; application Ser. No. 10/641,161, filed Aug. 15, 2003; application Ser. No. 10/646,833, filed Aug. 25, 2003; application Ser. No. 10/646,721, filed Aug. 25, 2003; and application Ser. No. 10/641,034, filed Aug. 15, 2003, now U.S. Pat. No. 7,409,339. All of which are incorporated herein by reference in their entireties.

BACKGROUND

1. Field of Invention

The present invention relates to television technology, and more particularly to providing television functionality on a single integrated circuit chip.

2. Background

Television systems have become increasingly complex as consumers continue to demand greater functionality and performance from television sets. Furthermore, the miniaturization of television systems demands that while complexity is increasing, that the size of electronic circuitry to support this complexity and performance must be reduced. At the same time, market forces continue to drive prices lower for television sets. Current electronic circuitry to support the functionality needed to receive audio and video signals that are either analog or digital and process those signals to provide a signal suitable for display on a television often consist of several integrated circuits. Furthermore, additional functionality related to value added features, such as teletext or e-commerce often requires additional integrated circuits.

What is needed is a system for providing television functionality and ancillary functionality on a single integrated chip to reduce costs and support the continued miniaturization of electronics for televisions.

BRIEF SUMMARY OF THE INVENTION

The present invention provides a cost effective approach for implementing television functionality on a single integrated circuit chip (referred to herein as "TV on a Chip" or TVOC). A TVOC includes functionality to receive and display television signals in a variety of input and output formats. A TVOC can be used in set-top boxes for cable and satellite television, or directly within a television. All or substantially all functionality provided can be provided on a single integrated circuit. TVOC includes one or more of a data transport module, an IF demodulator, a digital audio engine, an analog audio engine, a digital video engine, and an analog video engine. The TVOC also includes three sets of interfaces including output interfaces, control interfaces and ancillary interfaces.

The present invention addresses the conflicting consumer demands of television system miniaturization and reducing the cost of televisions.

Further embodiments, features, and advantages of the present inventions, as well as the structure and operation of the various embodiments of the present invention, are described below.

BRIEF DESCRIPTION OF THE FIGURES

The invention is described with reference to the accompanying drawings. In the drawings, like reference numbers indicate identical or functionally similar elements. The drawing in which an element first appears is indicated by the left-most digit in the corresponding reference number.

DETAILED DESCRIPTION

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the present invention would be of significant utility.

Figure 1:
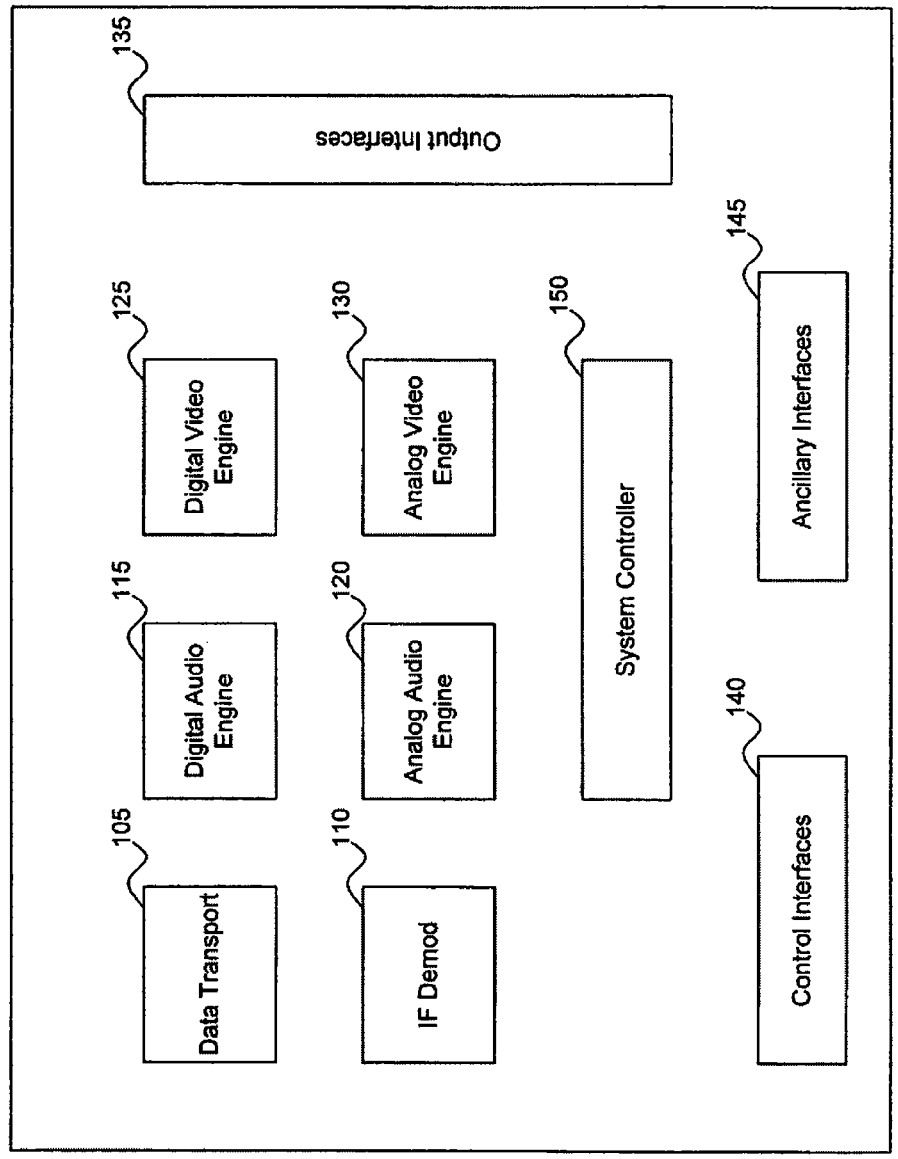
FIG. 1 is a functional block diagram of a television on a chip, according to an embodiment of the invention.

FIG. 1 provides a functional block diagram of television on a chip (TVOC) 100, according to an embodiment of the invention. A TVOC includes the functionality necessary to receive and display television signals in a variety of input and output formats. A TVOC can be used in set-top boxes for cable and satellite television, or directly within a television. All functionality provided can be provided on a single integrated circuit. TVOC 100 includes data transport 105, IF demodulator 110, digital audio engine 115, analog audio engine 120, digital video engine 125, analog video engine 130, output interfaces 135, control interfaces 140, ancillary interfaces 145, and system controller 150.

Data transport 105 can receive digital video data and performs preprocessing of the data for use throughout other TVOC 100 components.

IF demodulator 110 contains functionality to receive analog television signals and perform processing to produce digital and analog video and audio signals for use within the other components of TVOC 100.

Digital audio engine 115 can process digital audio signals, while analog audio engine 120 can process analog audio signals. Similarly, digital video engine 125 can process digital video signals, while analog video engine 130 can process analog video signals. Digital video engine 125 and analog video engine 130 also have the capability to process graphics, and integrate those graphics within the video and audio outputs.

Output interfaces 135 can output various types of analog and digital audio and video signals. Control interfaces 140 can provide a means for external control of TVOC 100. Ancillary interfaces 145 can provide access to various types of ancillary input and output devices, such as access to establish an Ethernet connection with the TVOC 100. System controller 150 can control overall operation of the circuitry within TVOC 100.

Figure 2:
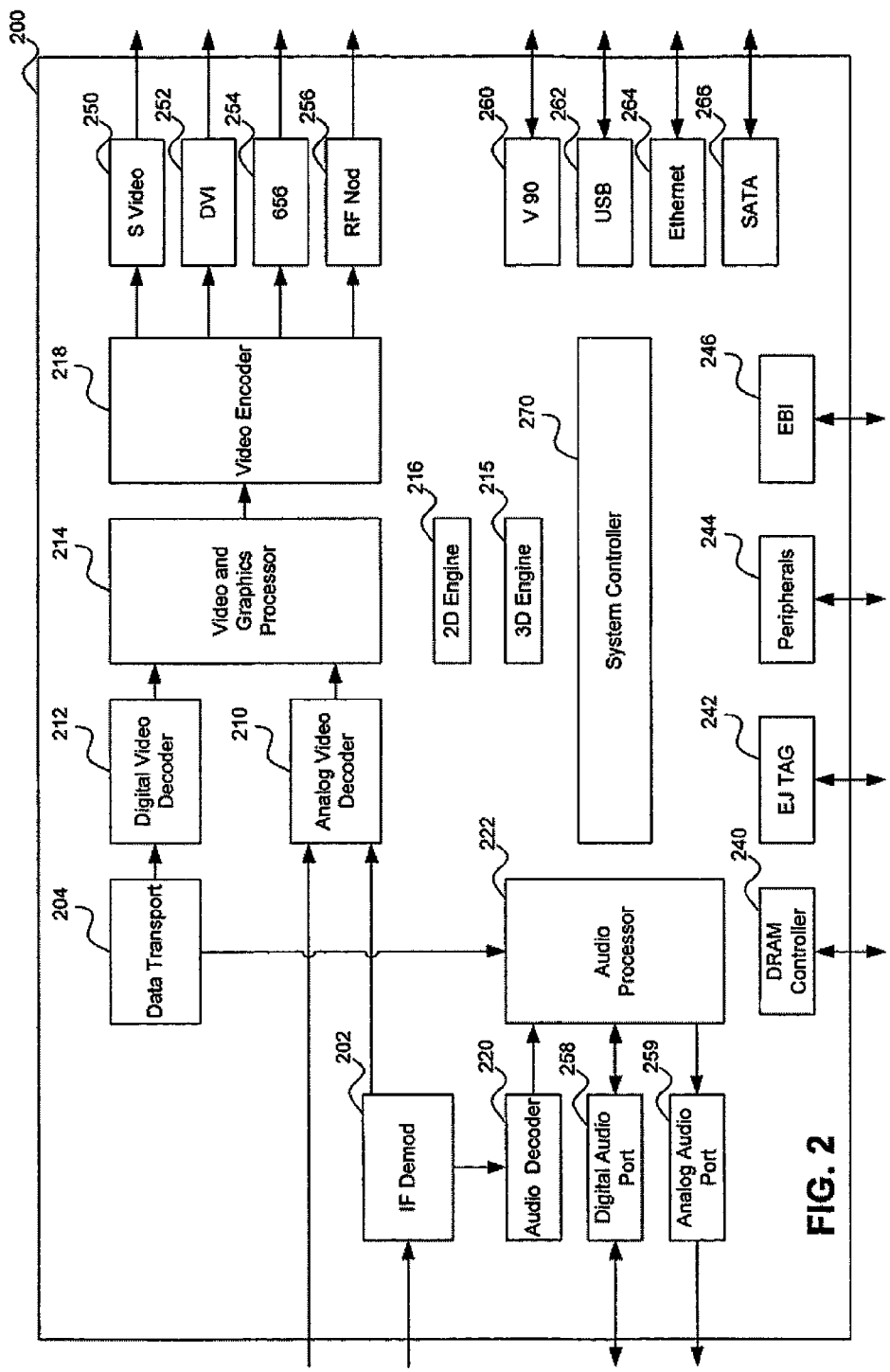
FIG. 2 is a detailed functional block diagram of a television on a chip, according to an embodiment of the invention.

FIG. 2 provides a detailed functional block diagram of TVOC 200, according to an embodiment of the invention. TVOC implementations will vary depending on the particular environment in which a TVOC will be used. For example, depending on the country of use, a TVOC may be required to support different types of video or audio standards. Additionally, a TVOC may be required to support standard definition, high definition or both types of television signal broadcasts. Increasingly, cable set top box and television set manufacturers require that chips and chip sets support a wide range of standards and uses. TVOC 200 provides an embodiment of a TVOC that provides a set of functionalities that meets this need. TVOC 200 is provided to illustrate one embodiment of a TVOC, and is not intended to be limiting. Based on the teachings herein, individuals skilled in the relevant arts will be able to ascertain alternative embodiments to TVOC 200. It is intended that these embodiments are within the scope of the invention.

As in the case of TVOC 100, TVOC 200 includes input elements, video and graphics processing elements, audio processing elements, control elements, control interfaces, output interfaces and ancillary interfaces. Additionally, TVOC 200 includes elements that further facilitate the integration of television functionality on a single integrated circuit.

The input elements of TVOC 200 include intermediate frequency (IF) demodulator 202 and data transport module 204. IF demodulator 202 operates on an analog television signal to produce a digital baseband composite video broadcasting signal (CVBS) and a digital audio signal, such as a monaural or Broadcast Television System Committee (BTSC) baseband multiplex signal. The analog input signals can include, among others, National TV System Committee (NTSC), Phase Alternation Line Rate (PAL), and Sequential Couleur Avec Memoire (SECAM) television signals.

In an embodiment, IF demodulator 202 is optionally a digital IF demodulator that receives and demodulates an analog IF input signal to produce a digital audio signal and a digital video signal. Where the analog IF input signal is a television signal or channel that has been down-converted from RF, IF demodulator 110 includes an A/D converter, a first digital complex mixer, a second digital complex mixer, and various digital filters. The A/D converter receives the analog IF input signal and converts it to digital. The first digital complex mixer receives the output of the A/D converter and down-converts the output of the A/D converter to baseband.

Additionally, a picture carrier is recovered from the output of the first digital complex mixer, and fed back to a direct digital synthesizer to control the tuning accuracy of the first digital complex mixer. More specifically, a feedback loop is configured so that the picture carrier is down-converted to DC so as to control the tuning accuracy of the first digital complex mixer. The complex output of the first complex mixer is further processed using Nyquist filtering and other filtering to recover the digital video signal. Such filtering may be accomplished using digital signal processing techniques. The digital audio signal is recovered by further processing the output of the first digital complex mixer. A digital IF demodulator embodiment of IF demodulator 202 is further taught in copending application, U.S. patent application Ser. No. 10/448,062, filed May 30, 2003, now U.S. Pat. No. 7,102,689, which is incorporated herein by reference in its entirety.

Figure 8:
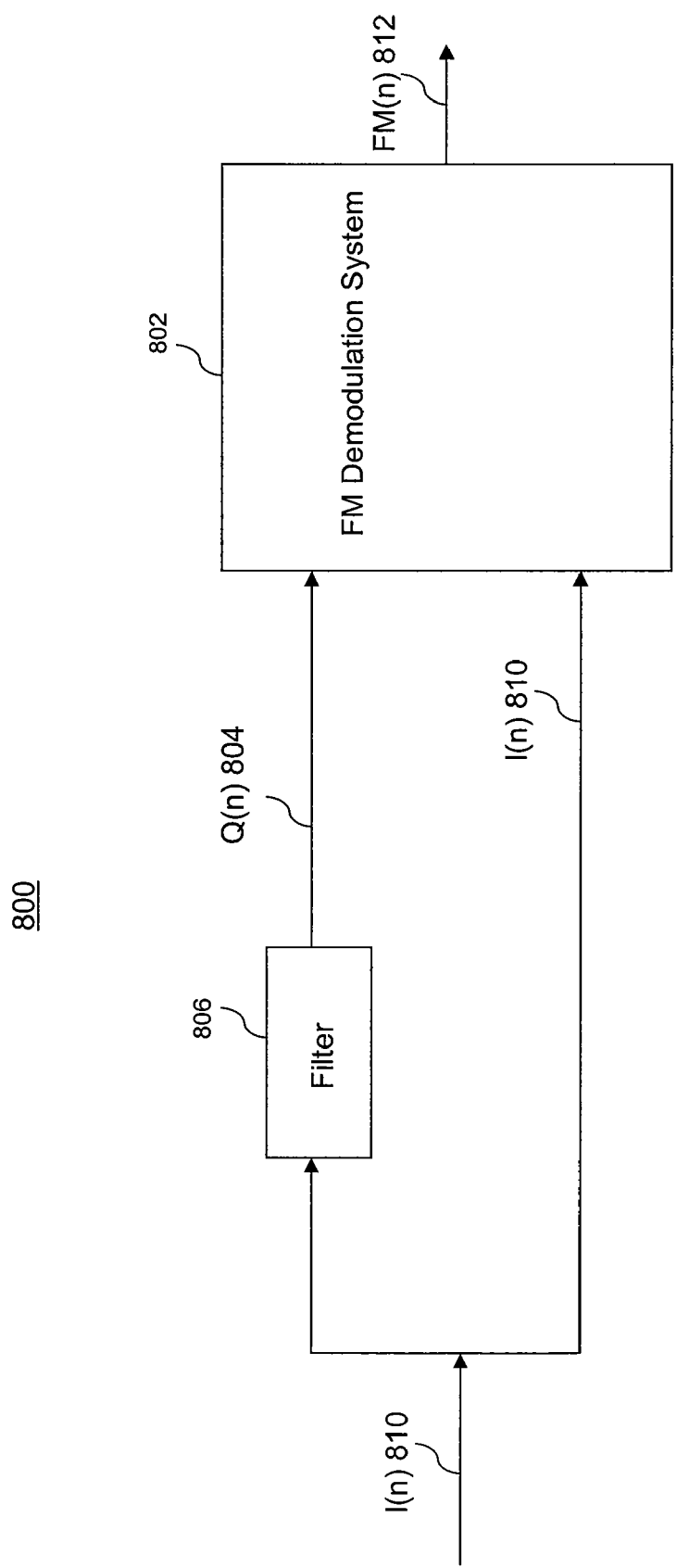
FIG. 8 illustrates a block diagram of an exemplary FM demodulation system.

In an embodiment, IF demodulator 202 can optionally include a FM demodulation system for approximating $y(n) = 1/(x(n))$, where $x(n) = I^2(n) + Q^2(n)$. An exemplary FM demodulation system 800 is illustrated in FIG. 8. FM demodulator 800 can include a filter 806 (e.g., a Hilbert Filter) that generates a quadrature-phase signal Q(n) 804 from I(n) 810. The signals I(n) 810 and Q(n) 804 are input into an FM demodulation system 802, which produces FM(n) output signal 812. A secondary audio program (SAP) signal received must be processed in order to generate a pulse code modulated signal (PCM) output signal. Typically, a SAP signal is band pass filtered, FM demodulated, and processed using a variable de-emphasis algorithm to produce the PCM. The FM demodulation can be carried out using an equation $FM(n) = [I(n)Q'(n) - I'(n)Q(n)]/[I^2(n) + Q^2(n)]$. Conventional systems typically calculate the numerator and ignore the denominator because the division is too complex. This is because conventional processors do not have enough hardware and/or software support to perform such complex division. Thus, a noise signal received by a FM demodulator is passed on in the FM(n) output signal because the denominator is not calculated along with the numerator. This noise can cause problems down the line during subsequent signal processing.

The optional FM demodulation system described above addresses this problem by approximating the denominator during demodulation of an FM signal. The FM demodulation system receives a prior estimated value of 1/x(n) and a present value of x(n). The FM demodulation system also adjusts the prior estimated value of 1/x(n) to compensate for an error between the prior estimated value of 1/x(n) and the present value of 1/x(n). The FM demodulation system outputs an adjusted prior estimated value of 1/x(n) as the present value of 1/x(n). An FM demodulation system is further taught in copending application, U.S. patent application Ser. No. 10/629,797, filed Jul. 30, 2003, which is incorporated herein by reference in its entirety.

Data transport module 204 receives compressed video data, normally in the form of MPEG or DIRECTTV transport streams. Data transport module 204 parses the streams and performs preprocessing. Data transport module 204 can optionally support personal video recording.

In an embodiment, data transport module 204 can optionally include a video data stream front end processor. When program channels are transmitted to customer premise devices, such as a television or cable set top box, data packets for program channels are typically multiplexed together into a video data stream. A common way to identify packets within a video data stream that are associated with a particular program channel uses program identification (PID) information. This approach is referred to herein as a PID parsing approach. In this approach, each packet within a video data stream contains a PID that contains information that tells a customer premise device which channel a particular packet of information is associated with.

In another approach, data packets within a video data stream that are associated with a particular program are allocated within particular time slots of a data frame. With this approach a distribution device, such as a cable system headend, organizes data packets into frames with packets for a particular program channel located in specific time slots within the frames. This approach is referred to herein as a time division multiplexing approach. An example of this approach is transport stream multiplexing format (TSMF), which has been recently developed by a consortium of television manufacturers for use in Japan. Within this approach it is also common that packets will contain a PID. The video data stream front end processor provides an efficient way to demultiplex video signals that use both a PID and are multiplexed using a time division multiplexing approach.

Figure 9:
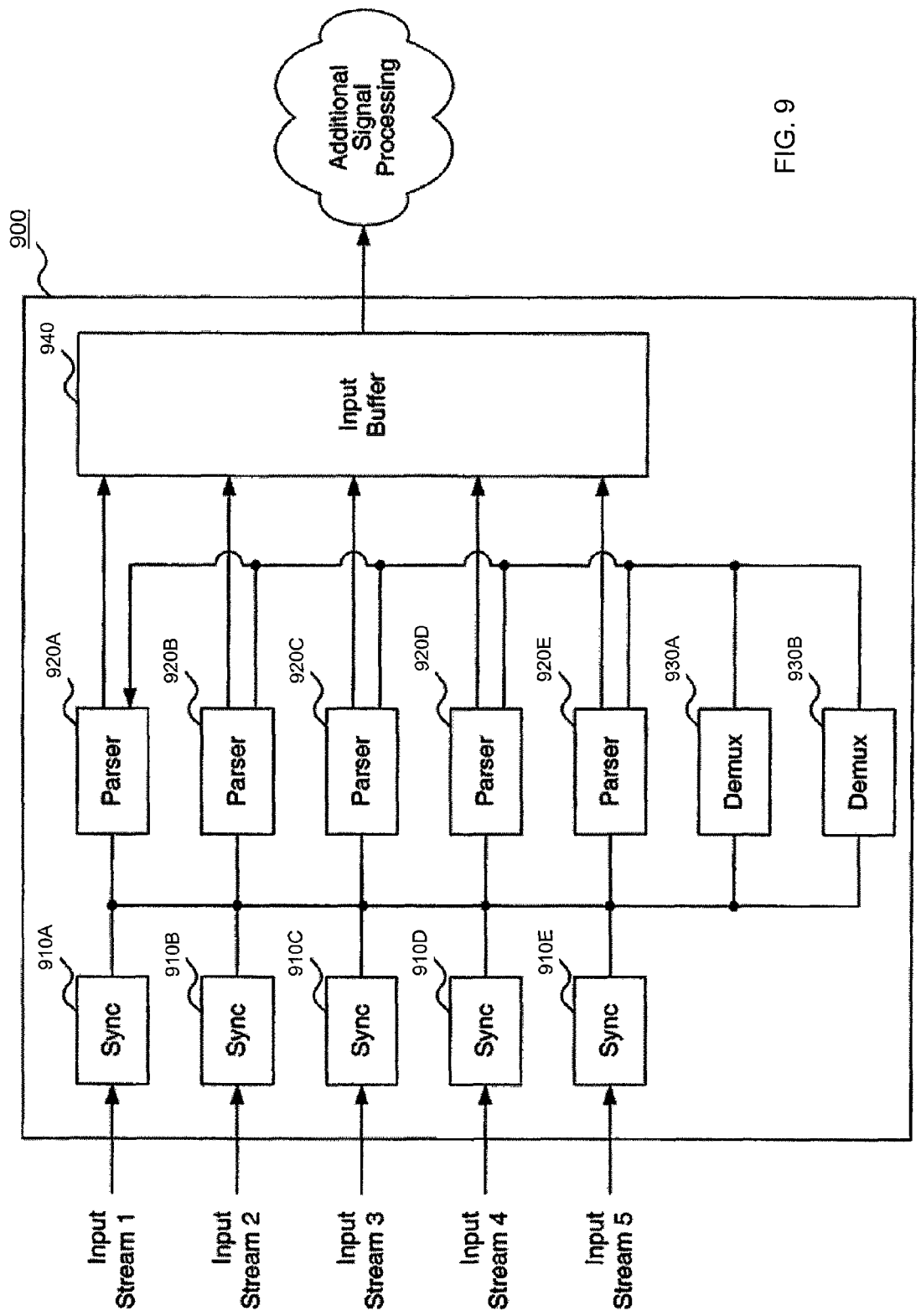
FIG. 9 illustrates a block diagram of an exemplary a video data stream front end processor.

An exemplary video data stream front end processor system 900 as illustrated in FIG. 9 includes synchronizers 910A-910E, parsers 920A-920E, demultiplexers 930A and 930B, and an input buffer 940. Each demultiplexer within the system includes a header detect module, a slot map module, a frame sync module and a packet accept module. The video data stream front end processor analyzes the PID and slot location for each packet received in a data stream, and based on the PID and slot location a packet is either accepted or rejected. The video data stream front end processor is further taught in co-pending application, U.S. patent application Ser. No. 10/640,682, filed Aug. 14, 2003, which is herein incorporated by reference in its entirety.

In an embodiment, data transport module 204 can optionally include a packet substitution module for substituting packets into a data stream. When program channels are transmitted to customer premise devices, such as a television or cable set top box, data packets for program channels are typically multiplexed together into a video data stream. When the video data stream is received by a customer premise device, the customer premise device typically parses the incoming stream to retain only those packets that pertain to the channel of interest to be viewed or recorded.

The parsing process can create gaps in the data stream where packets associated with channels other than the channel of interest were located. The parsing of the stream potentially leaves time gaps where packets were removed. As the complexity of data processing systems increases, the need for a robust and flexible approach to substitute packets into a data stream, such as a video data stream, increases without impairing performance. In particular, system and management information associated with a data stream is likely to change as a result of adjustment in encryption or organization of packets within a data stream, for example. Moreover, different types of information may need to be inserted into a data stream, and the different types of information may have different timing requirements. Different types of information can include, for example, system information for video control, system information for audio control, overall system management information, or customer specific application information.

Figure 10:
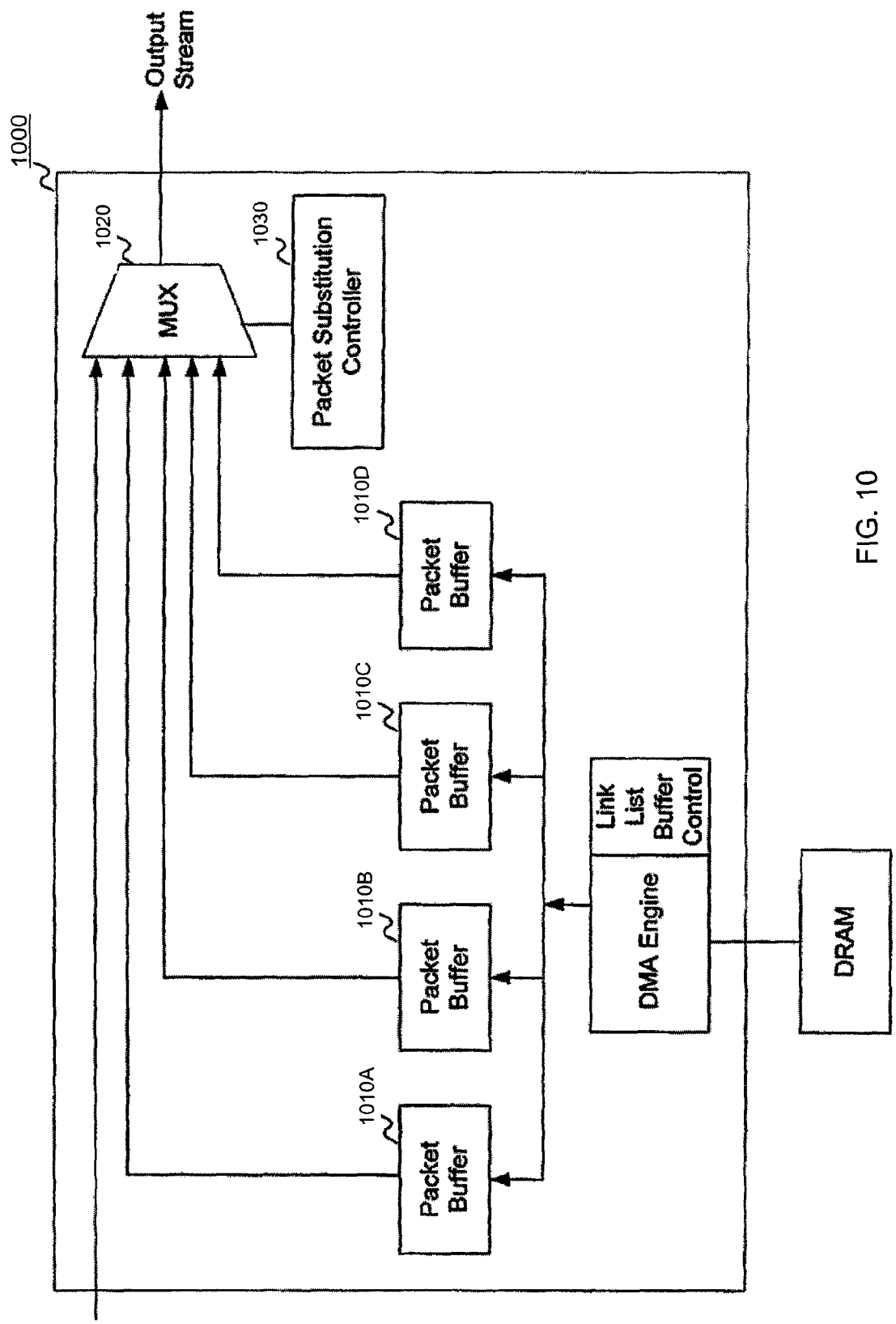
FIG. 10 illustrates a block diagram of an exemplary packet substitution module.

The packet substitution module provides a system for efficiently substituting data packets into a data stream. An exemplary packet substitution module system 1000 as illustrated in FIG. 10 includes a set of packet buffers 1010A-1010D that buffer packets to be substituted into the data stream. The packet substitution module system 1000 also includes a multiplexer 1030 that obtains packets from the set of packet buffers 1010A-1010D and substitutes packets into the data stream. The operation of the multiplexer 1020 is controlled by a packet substitution controller 1030. A direct memory access engine provides packets for insertion to the packet buffers based on a link list buffer control that is coupled the direct memory access engine. The packet substitution module is further taught in co-pending application, U.S. patent application Ser. No. 10/640,684, filed Aug. 14, 2003, which is herein incorporated by reference in its entirety.

In an embodiment, data transport module 204 can optionally include a media processing system for processing multiple program channels containing one or more data packets. TVOC 200 may use a system time clock that is independent of the system time clock of a transmitting system. Because these system time clocks are asynchronous, the receiver clock may run at a slightly different rate than the transmitter clock. For example, when the receiver clock runs slower than the transmitter clock, data packets arrive faster than the receiver processes them causing the input buffer to overflow. In addition, the lack of precise timing between the transmitter and receiver creates deleterious effects on video display such as lack of synchronization between video and audio. A common technique to minimize the impact of these timing errors is to synchronize the system time clock of the receiver to the system time clock of the transmitting device. This clock "locking" technique reduces timing errors associated with data packets from the transmitter on which the receiver clock is locked.

However, in modern systems, data from multiple transmission sources (for example, multiple programs) are often multiplexed together in a single transport stream. If traditional clock locking techniques were used, TVOC 200 would be able to synchronize to the system time clock of only one of these transmission sources. As a result, the data streams from the other transmission sources having different system time clocks are susceptible to the timing errors discussed above.

Figure 11:
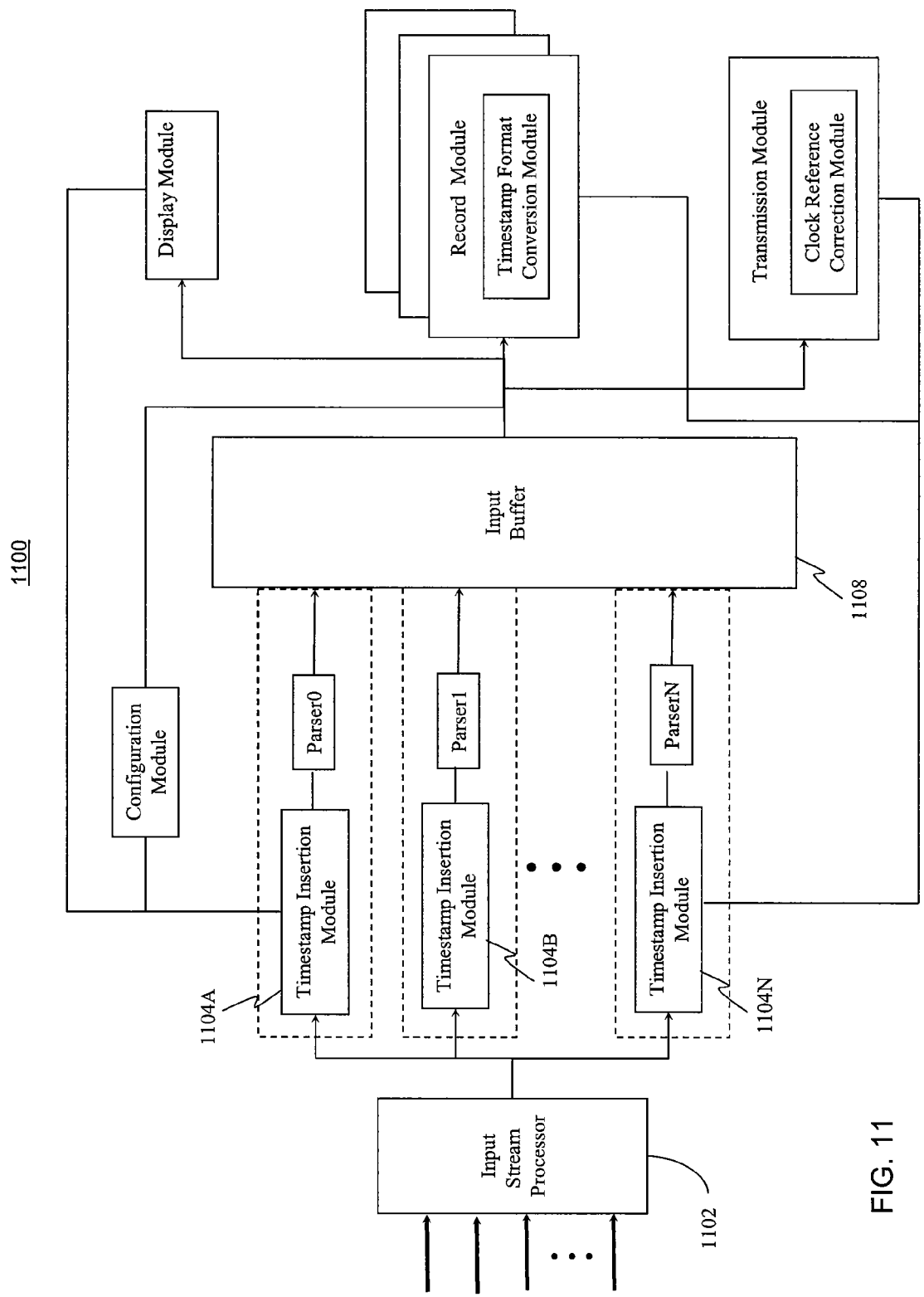
FIG. 11 illustrates a block diagram of an exemplary media processing system.

In addition, while being processed by the receiver, data packets may experience delay. This internal receiver delay introduces error into the clock reference values being forwarded to the downstream systems and applications. This error impacts the ability of the downstream system or application to synchronize its system time clock with the system time clock of the original transmitting system. The media processing system addresses these challenges. An exemplary media processing system 1100 as illustrated in FIG. 11 includes a processor 1102, a set of timestamp insertion modules 1104A-1104N coupled to the processor 1102. The number of timestamp insertion modules 1104 would be equal to the number of program channels being processed. Each timestamp insertion module 1104 would include a local program reference clock, a synchronizer that synchronized the local program reference clock to a clock of a device transmitting the program being processed, a local program timestamp generator, and an input buffer 1108 may be coupled to the timestamp insertion modules. The media processing system is further taught in co-pending application, U.S. Patent Application No. 60/495,129, filed Aug. 15, 2003, which is herein incorporated by reference in its entirety.

The video processing elements of the TVOC 200 include analog video decoder 210, digital video decoder 212, video and graphics processing module 214, 3D engine 215, 2D engine 216 and video encoder 218. Analog video decoder 210 supports high quality decoding of a standard definition composite video broadcasting signal (CVBS) and S-Video signal. Digital video decoder 212 decodes video signals that comply with the International Telecommunications Union (ITU) standard ITU-R-656 at varying resolutions including 525i, 625i and 240p.

In an embodiment, analog video decoder 210 and/or digital video decoder 212 can optionally include a 2-D adaptive comb filter. A composite video signal is the sum of a luminance (brightness) signal and a chrominance (color) signal. These signals are also referred to as luma and chroma signals, respectively. The frequency ranges of the luma and chroma signals are designed to overlap. A problem created by overlapping the luma and chroma frequency spectra is that it is difficult to separate them completely.

2-D adaptive comb filter addresses this challenge. 2-D adaptive comb filter filters the video information both horizontally along the scan lines and vertically between the horizontal scan lines. To filter horizontally, a low-pass or band-pass filter is used. To filter vertically, a combing procedure is used. Adaptive logic solves the problem of combing at a vertical color transition point. The logic examines three successive horizontal scan lines simultaneously. At a vertical transition between two colors, either the top two or bottom two scan lines will usually be the same. Initially, for example, the top two of three scan lines will be the same color. The logic directs those lines to a digital version of the comb filter. When the scan moves down another line, the scan line triplet includes a new bottom line. The bottom two scan lines of the new triplet will have the new color, and the bottom lines will be directed to the comb filter. In this manner, two lines with different colors are not input to the comb filter at a transition boundary.

Figure 14:
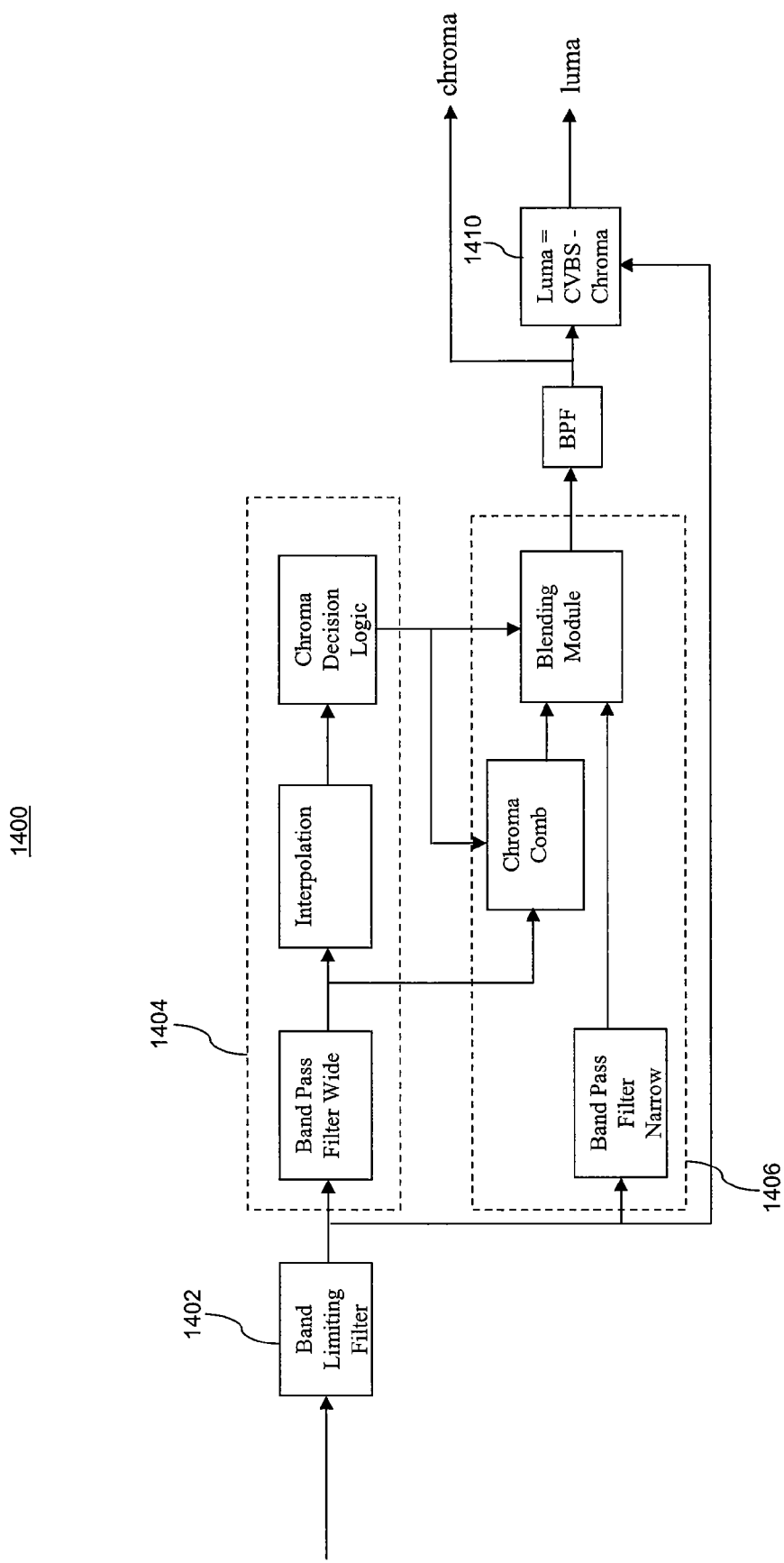
FIG. 14 illustrates a block diagram of an exemplary 2D adaptive comb filter.

An exemplary 2D adaptive comb filter 1400 as illustrated in FIG. 14 includes a band limiting filter 1402, a decision stage 1404, a blending stage 1406, and a processor 1410. A composite video signal including luma and chroma subcarriers enters the band limiting filter after passing through an analog-to-digital converter. After band limiting filter, the original signal is split among three different paths. The first path is a decision stage. The decision stage includes a wide bandpass filter, interpolator, and chroma decision logic. The second path is the blending stage. The blending stage includes a narrow bandpass filter, a chroma comb filter, and a blending module. The third path leads directly to the processor. The 2D adaptive comb filter is further taught in co-pending application, U.S. patent application Ser. No. 10/641,160, filed Aug. 15, 2003, which is herein incorporated by reference in its entirety.

Figure 12:
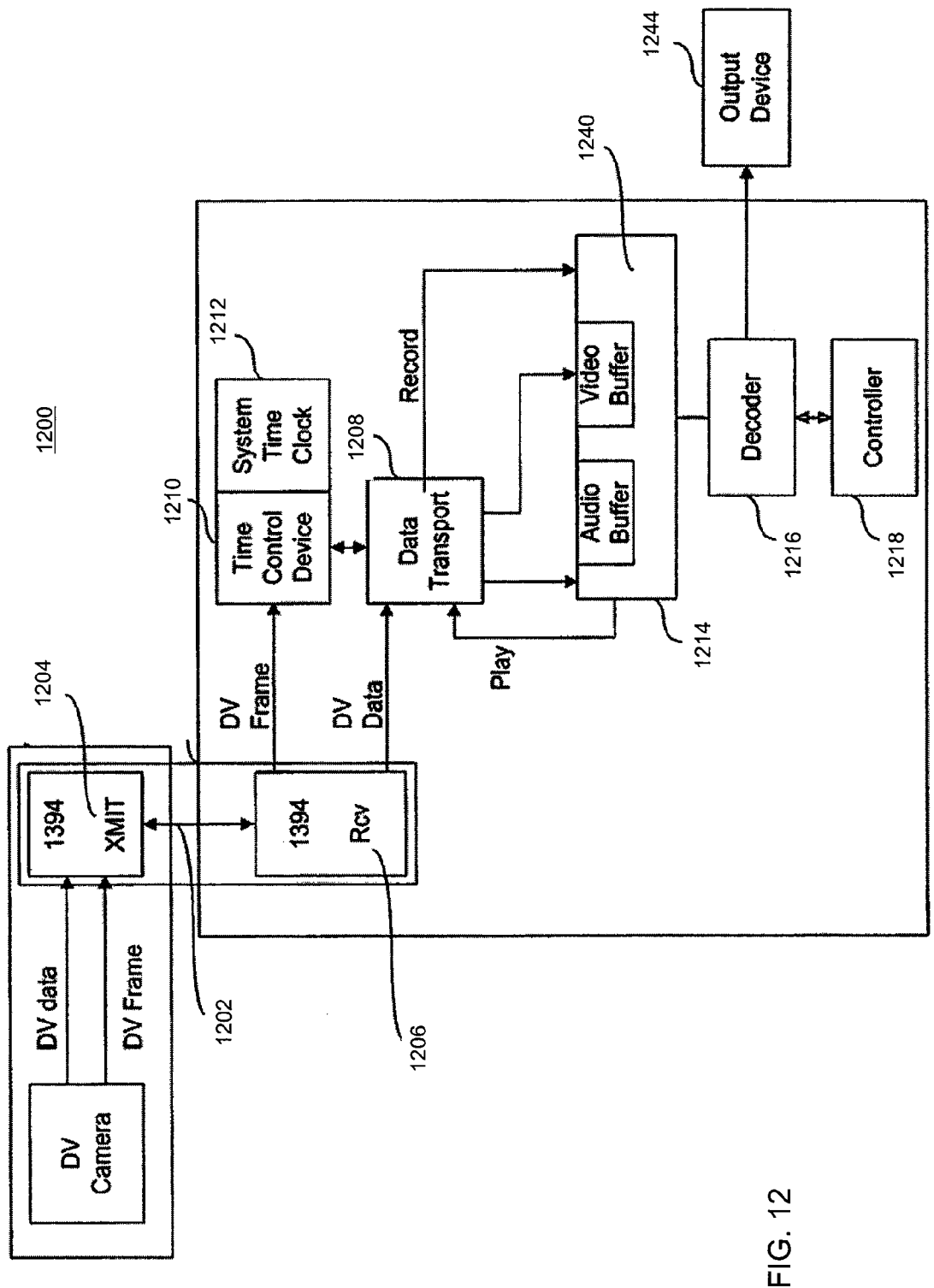
FIG. 12 illustrates a block diagram of an exemplary video system having an artificial time stamp module.

In an embodiment, digital video decoder 212 can optionally include an artificial time stamp module that generates pseudo MPEG information from received digital video information, such as DV25 and DV50 information generated by digital video cameras. This DV25 and DV50 information lacks timestamps used by MPEG signal processors. An exemplary artificial time stamp module including system time clock 1212 and time control device 1210 is illustrated in FIG. 12 illustrating a video system 1200. A data transport device 1208 controls the transmission of data within system 1200. A time control device 1210 can be used to generate and associate time stamp information with the data. A system time clock 1212 can be used in one embodiment in conjunction with the time control device to generate time stamp information. A storage device 1214 is used to store the pseudo MPEG information and other data received by data transport device 1208. A decoder 1216 is used to decode the pseudo MPEG information. A controller 1218 can be used to control one or more components of system 1200. Output device 1244 outputs the decoded pseudo MPEG information based on the artificial time stamp information. An artificial time stamp module generates timestamps that are inserted into the DV25 or DV50 information, thereby facilitating decoding by an MPEG signal processor. An artificial time stamp module is further taught in co-pending application, U.S. patent application Ser. No. 10/640,648, filed Aug. 14, 2003, which is herein incorporated by reference in its entirety.

Figure 16:
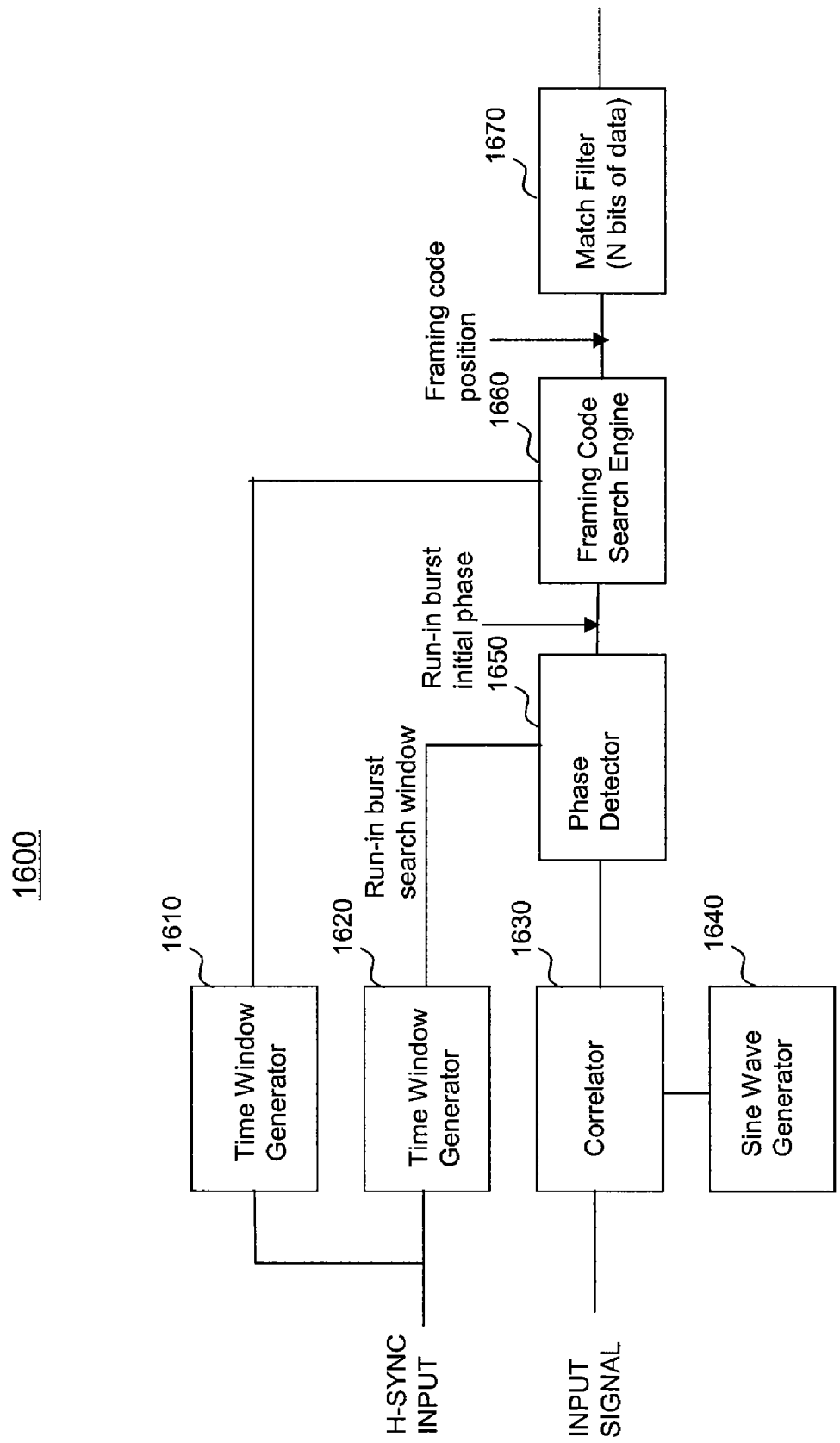
FIG. 16 illustrates a block diagram of an exemplary system for detecting and decoding teletext message sequences.

In an embodiment, digital video decoder 212 can optionally include a teletext decoder system for processing teletext message sequences. The teletext decoder provides a system for efficiently decoding and detecting valid teletext message sequences. An exemplary teletext decoder system 1600 as illustrated in FIG. 16 includes a correlator 1630, a sine wave generator 1640, a first time window generator 1610 and a second time window generator 1620, a phase detector 1650, a framing code search engine 1660, and a match filter 1670. The teletext decoder system determines the phase of the run-in burst of a teletext message sequence, identifies the framing code location, decides whether the teletext sequence is valid and decodes the teletext data for display. The teletext decoder system is further taught in copending applications, U.S. Provisional Patent Application No. 60/467,574, filed May 5, 2003, which is incorporated herein by reference in its entirety, and in U.S. patent application Ser. No. 10/629,781, filed Jul. 30, 2003, now U.S. Pat. No. 7,102,689, which is incorporated herein by reference in its entirety.

Video and graphics processing module 214 includes a variety of functions for processing video and graphics, and for integrating video and graphics. In particular, video and graphics processing module 214 can optionally include MPEG, graphics and video feeders; video scalers; capture blocks; and/or video compositors for combining video and graphics. 3D engine 215 provides low bandwidth three dimensional (3D) graphics rendering for set-top boxes and television displays without sacrificing the performance needed for Internet e-commerce 3D applications and games.

Figure 13:
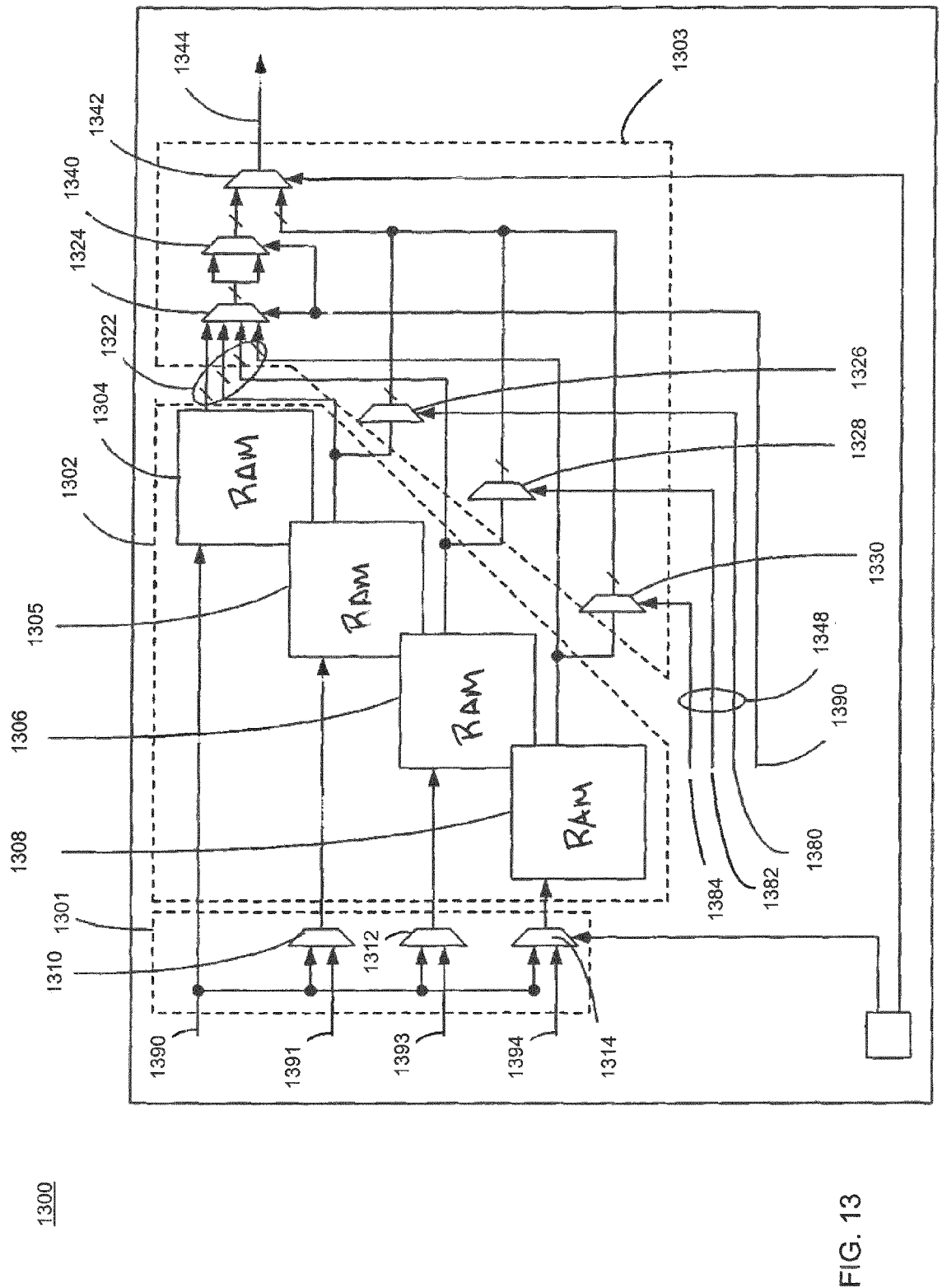
FIG. 13 illustrates a block diagram of an exemplary RAM implementation of a color lookup table and gamma correction function.

In an embodiment, video and graphics processing module 214 can optionally include a combined color look-up and gamma correction system. Color look-up table and gamma correction routines are used to improve video graphics displayed on a television. An exemplary combined color look-up and gamma correction system includes a memory having color look up table (CLUT) parameters and gamma correction parameters stored therein. The combined color look-up and gamma correction system includes an input matrix configured to receive first and second type pixel data. Memory is coupled to the input matrix and configured to associate one of the first and second type pixel data with the stored CLUT parameters and associate the other of the first and second type pixel data with the stored gamma correction parameters. For example, an exemplary RAM memory system 1300 is illustrated in FIG. 13. System 1300 is configured to perform both CLUT and gamma correction functions, in accordance with the present invention. System 1300 includes an input matrix 1301, a memory section 1302, and an output matrix 1303 configured to receive the input pixel words 1390, 1391, 1393, and 1394. The memory section 1302 includes RAMs 1304, 1305, 1306 and 1308. The RAMs 1305, 1306, and 1308 are respectively connected to input multiplexing devices 1310, 1312 and 1314. When configured for the gamma correction mode, individual color components 1380, 1382 and 1384 are provided as inputs to respective multiplexing devices 1310, 1312, and 1314 and along data lines 1348 as inputs to respective multiplexing devices 1326, 1328, and 1330. Four data paths 1322 are coupled to multiplexing device 1324. An output of the multiplexing device 1324 is provided to a multiplexing device 1340. Multiplexing device 1342 receives one input from the multiplexing device 1340 and other inputs from the multiplexing devices 1326, 1328 and 1330, to provide an output 1344.

Two primary types of graphics image format exist. In one format, the pixel contains all the color component information (e.g., YUV422 or ARGB8888). In the other format, the pixel contains an index (e.g., CLUT format). In order to support CLUT format and Gamma-correction function, conventionally two separate RAMs were needed. In the combined color look-up and gamma correction system, however, the CLUT function is combined with the gamma-correction function by applying a gamma-correction equation on the color look-up-table.

The combined color look-up and gamma correction system provides one RAM for sharing both CLUT and gamma correction functions. More specifically, one RAM arrangement is integrated such that the same RAM can be used for CLUT+Gamma-Correction (for CLUT format) or just Gamma-Correction (for other formats). This RAM arrangement provides economies in terms of space savings on the integrated TVOC 200 circuit, by providing for a more efficient process to implement CLUT and gamma correction functions. Additionally, the combined color look-up and gamma correction system provides a more efficient software setup that does not require special arrangements or address swapping. Combined color look-up and gamma correction system is further taught in co-pending application, U.S. patent application Ser. No. 10/640,666, filed Aug. 14, 2003, which is incorporated herein by reference in its entirety.

2D engine 216 provides two dimensional graphics processing. Video encoder 218 encodes processed video signals for output to a display. Video encoder 218 can optionally support both standard and high definition video signals. Video encoder 218 supports a variety of analog video standards (e.g., NTSC, PAL, SECAM, 480i, 480p, 720p, and 1080i), as well as digital video standards (e.g., ITU-R-656 and support for digital video interface (DVI) encoding). Additionally, video encoder 218 can receive video blanking interval (VBI) signals. Video encoder 218 combines these VBI signals with appropriate lines of video to support arrangements, such as closed captioning and teletext.

Figure 15:
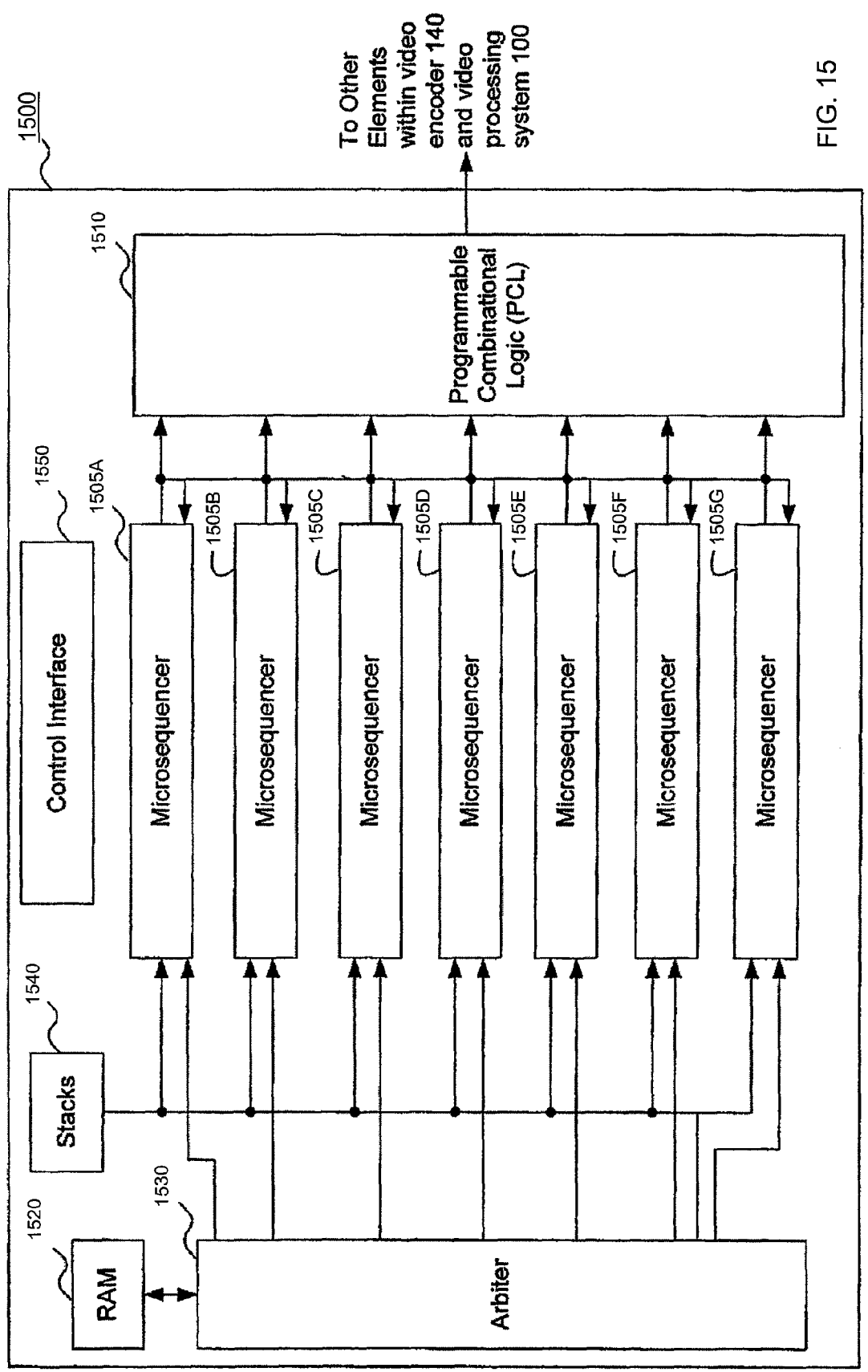
FIG. 15 illustrates a block diagram of an exemplary timing generator.

In an embodiment, video encoder 218 can optionally include a timing generator that generates time-dependent control signals for video signals. Such control signals support outputting video signals in different formats and to implement a variety of value added features including, for example, copy protection features, such as those contained within MACROVISION copy protection process standards. MACROVISION is a trademark of Macrovision Corporation. An exemplary timing generator 1500 as illustrated in FIG. 15 includes a set of microsequencers 1505A-1505G, a programmable combinational logic (PCL) module 1510, shared memory, an arbiter 1530 for sharing of memory by the microsequencers 1505, stacks 1540 containing registers for microsequencer 1505 control, and a control interface. The timing generator can provide control signals for video signals, implement the MACROVISION copy protection process, and provide other value added features. Flags generated by the microsequencers are processed to generate one or more control signals used to support the outputting of video signals including those requiring MACROVISION copy protection. The generation of control signals is software controlled, thereby allowing the system to be reconfigured in real time, and permitting modifications to reflect changes in the MACROVISION copy protection process and other value added features for video signals. The invention provides an efficient way to flexibly produce time-dependent control signals for video signals. The timing generator is further taught in co-pending application, U.S. patent application Ser. No. 10/640,627, filed Aug. 14, 2003, which is hereby incorporated in its entirety.

Figure 17:
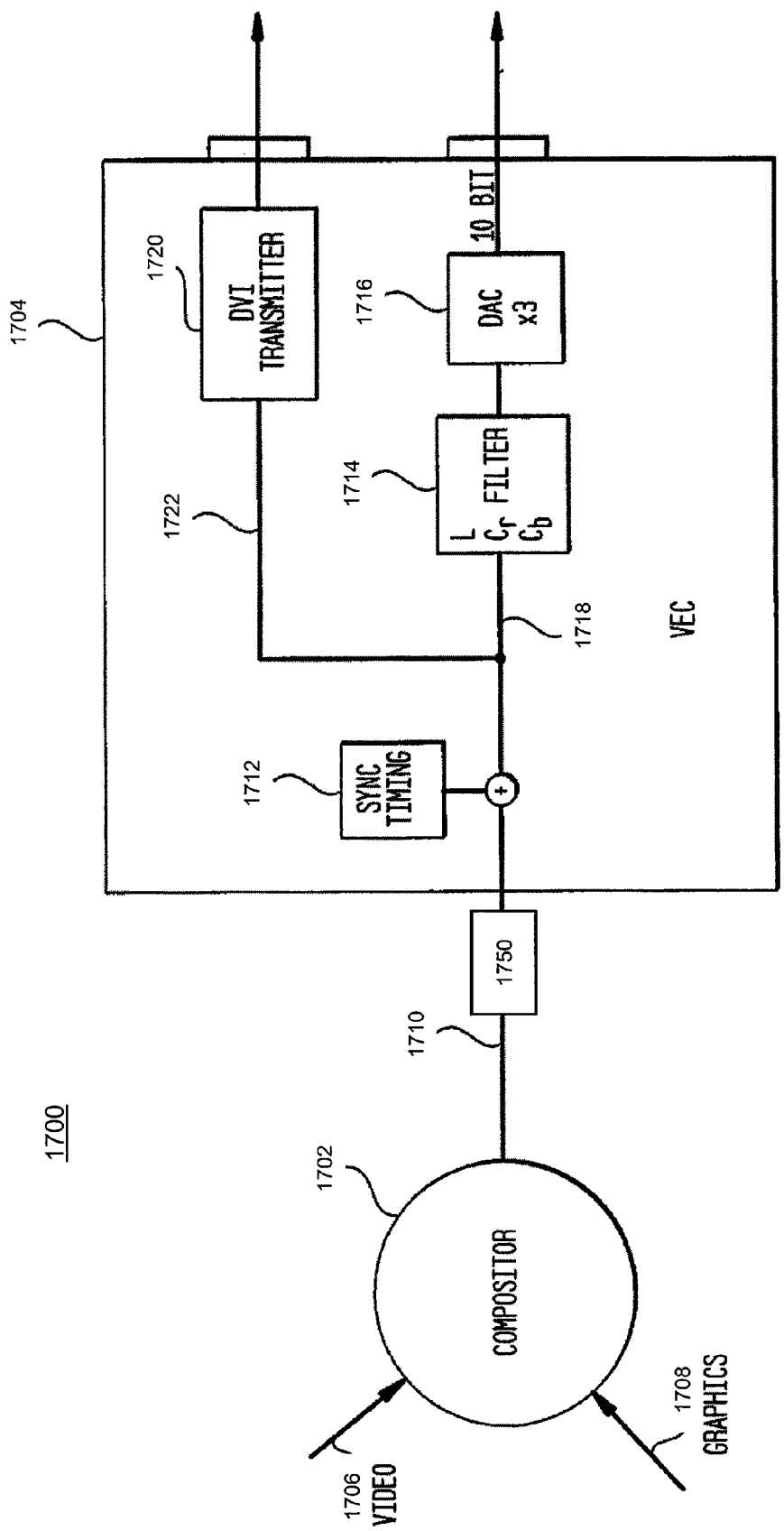
FIG. 17 illustrates a block diagram of an exemplary copy-protection filter.

In an embodiment, video encoder 218 can optionally include an MPAA (Motion Picture Association of America) HDTV (High Definition Television) copy protection filter system. The MPAA has released a set of standards to provide for copy protection of HDTV signals. In effect, these standards degrade or reduce the resolution of HDTV signals. The MPAA HDTV copy protection filter system provides an efficient system to reduce the resolution of a digital video signal to comply with the MPAA copy protection standards by integrating copy protection filters with elements of video encoder 218. An exemplary MPAA HDTV filter system is illustrated in FIG. 17. FIG. 17 shows a block diagram of an exemplary system 1700 included in, for example, a set-top box or a TV-on-a-chip system. System 1700 includes a compositor 1702 and a video encoder ("VEC") 1704. Compositor 1702 accepts an input video signal 1706 and an input graphics signal 1708. Compositor outputs composite video signal 1710. VEC 1704 includes a sync timing circuit 1712, a bandpass filter 1714, and a digital-to-analog converter ("DAC") 1716, along a first data path 1718. In one embodiment, VEC 1704 also includes a digital visual interface ("DVI") transmitter 1720 on a second data path 1722. A copy-protection filter 1750 may be inserted into one or more of the video signal data paths 1706, 1710, 1718, and 1722 (shown in 1710 only). In an embodiment, the copy-protection filter is a low-pass horizontal filter. In another embodiment, the copy-protection filter is a low-pass vertical filter. In yet another embodiment, a combination horizontal and vertical filter are used. For each filter, any number of taps may be used.

The copy-protection filter may be placed in an analog data path in the video encoder before the signal is converted to an analog signal. In another embodiment, a digital data path is coupled to the analog data path. The copy-protection filter can be placed on the analog data path after the connection between the analog and digital data paths. In yet another embodiment, a second copy-protection filter can be placed in the digital data path. The second copy-protection filter may be operated independently of the first copy-protection filter. In a further embodiment, the copy-protection filter may be combined with other filters in the system. In still another embodiment, the copy-protection filter may be combined with a video scaler before the initial video data stream enters the compositor. The MPAA HDTV copy protection filter system is further taught in co-pending application, U.S. patent application Ser. No. 10/641,031, filed Aug. 15, 2003, which is incorporated herein by reference in its entirety.

The audio processing elements of TVOC 200 include audio decoder 220 and audio processor 222. Audio decoder 220 can receive a baseband analog BTSC composite signal that was extracted by IF demodulator 202 and process the received signal to recover the main, stereo and SAP channels contained within the original signal. Audio decoder 220 can support BTSC and CPZ503 (used in Japan) standards for composite signals.

In an embodiment, an optional digital interface is coupled between IF demodulator 202 and a digital signal processor (DSP) within audio decoder 220. A potentiometer or implementation of an automatic gain control (AGC) algorithm in a digital signal processor within audio decoder 202 can be used to adjust the signal levels of right and left stereo signals. When a digital interface is used, IF demodulator 202 has an output that is scalable to ensure compatibility with different downstream DSP devices. Additionally, the output of the IF demodulator 202 is a digital signal, including composite BTSC samples that are compatible with multi-channel television sound (MTS) standards. Because the output includes digital composite samples, the digital interface can provide signals to the DSP in the digital domain. By using a digital interface, conversion mismatches associated with an analog interface are substantially reduced. The audio decoder digital interface is further taught in co-pending application, U.S. patent application Ser. No. 10/646,721, filed Aug. 25, 2003, which is incorporated herein by reference in its entirety.

Figure 18:
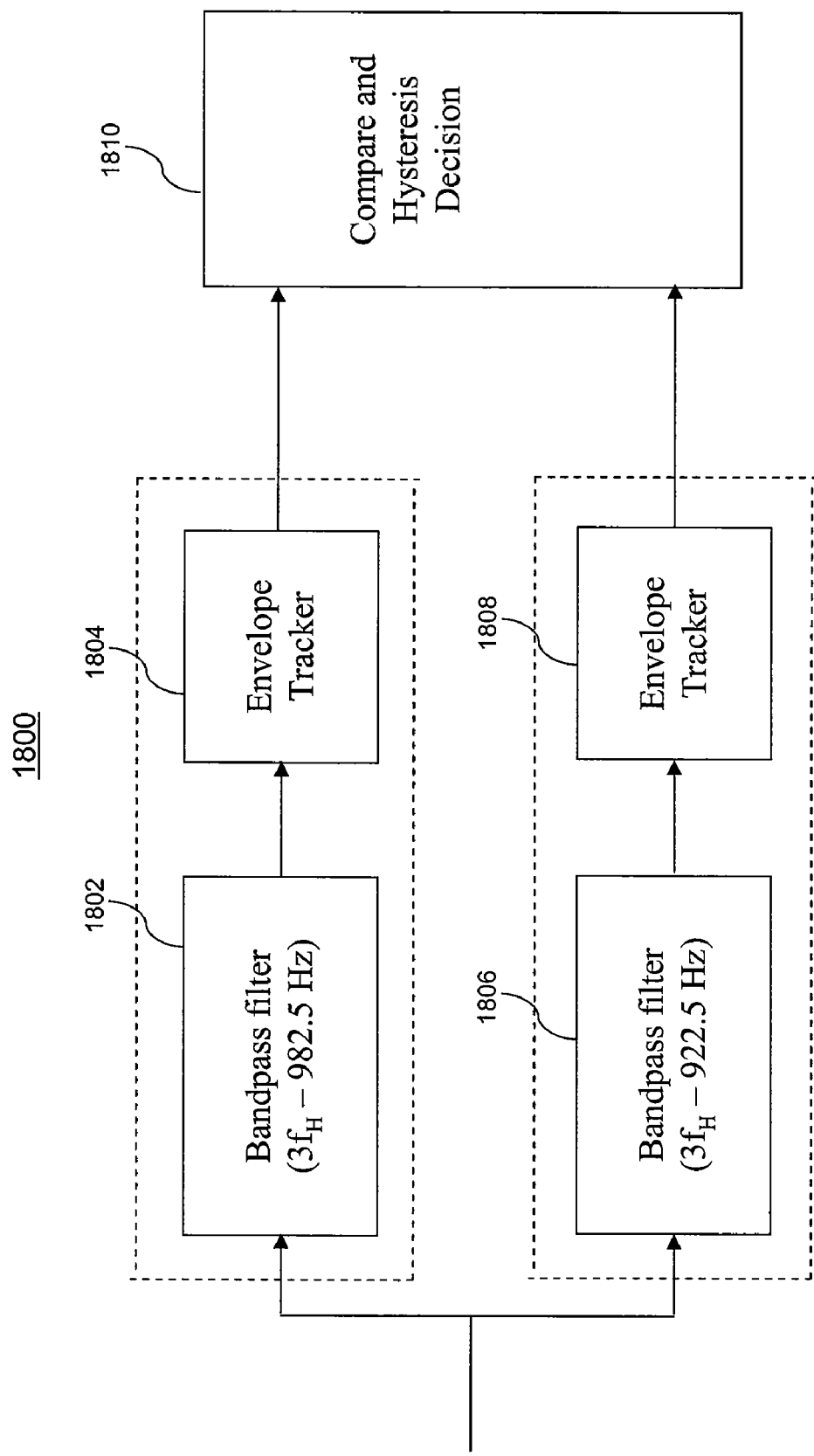
FIG. 18 illustrates a block diagram of an exemplary signal mode detection system.

In an embodiment, audio decoder 220 can optionally include a signal mode detection system. The signal mode detection system can be used, for example, to distinguish mono, dual mono and stereo modes in an audio transmission. An exemplary signal mode detection system 1800 as illustrated in FIG. 18 includes a first bandpass filter 1802, a first envelope tracker 1804 coupled to the first bandpass filter 1802, a second bandpass filter 1806, a second envelope tracker 1808 coupled to the second bandpass filter 1806, and a decision circuit 1810 coupled to both the first and second envelope trackers 1804 and 1808. The decision circuit is configured to process decision logic to determine whether an audio transmission is in mono, dual mono, or stereo mode. The signal mode detection system is particularly useful for processing Japanese Broadcast Television Systems Committee (JBTSC) standard audio broadcast signals, which have three modes of transmission. The signal mode detection system is further taught in co-pending application, U.S. patent application Ser. No. 10/641,004, filed Aug. 15, 2003, which is incorporated herein by reference in its entirety.

In an embodiment, audio decoder 220 can optionally include a JBTSC signal separation processor. Three channels exists within a JBTSC signal—a main channel, a sub channel and a control signal. The main channel includes the audio signal. The sub channel includes the difference between a right and left channel stereo signal contained in the main channel. The control signal includes information indicating the mode of transmission. The JBTSC signal separation processor supports the processing of all three channels. The JBTSC signal separation processor includes a sub path, a main path and a separator. The sub path includes a bandpass filter, a first filter path, a second filter path, an FM demodulator, a lowpass filter and a de-emphasis circuit. The JBTSC signal separation processor provides optimal separation of left and right stereo signals within a JBTSC. The JBTSC signal separation processor is further taught in co-pending application, U.S. patent application Ser. No. 10/641,161, filed Aug. 15, 2003, which is incorporated herein by reference in its entirety.

Figure 3:
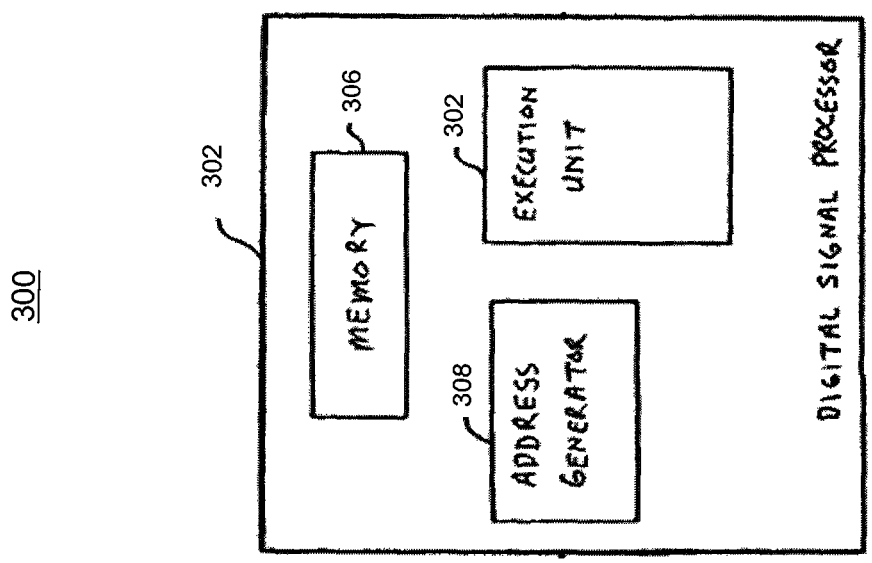
FIG. 3 illustrates a block diagram of an exemplary digital signal processor according to embodiments of the present invention.

In an embodiment, audio decoder 220 can optionally include a digital signal processor (DSP) decoder 300, such as one illustrated in FIG. 3, having an execution unit 302, a memory 306, an address generator 308 and an instruction set that can be used to decode input signals. The programmable address generator enables the execution unit to perform register addressing, indirect addressing and immediate addressing. An advantage of a DSP is that is reprogrammable and updateable. In other embodiments with different program instructions, a DSP decoder can also be used within digital video decoder 212 and analog video decoder 210. The DSP decoder is further taught in co-pending application, U.S. patent application Ser. No. 10/641,295, filed Aug. 15, 2003, which is incorporated herein by reference in its entirety.

In one application of the DSP decoder, a sampled signal can be converted to a higher data rate signal. In signal processing, sampled signals often need to be converted to higher or lower sample rates. Conventional sample rate converters (SRCs) suffer from a variety of drawbacks. For example, conventional SRCs typically interpolate between existing sample points to obtain new sample points. The interpolation is typically performed using known, pre-determined, fixed ratios between the lower data rate and the higher data rate. Results are then clocked out at the higher data rate. Such an interpolation is not performed in real time. Thus, when the higher data rate clock is affected by jitter or small/large frequency variations, for example, the higher data rate output does not necessarily track the lower data rate data.

Using the DSP decoder a method can be implemented that addresses these drawbacks. The method to convert a sampled signal to a higher data rate involves receiving conversion pulses having a conversion rate that is higher than a sample rate of the sampled signal. Next, two sample points on either side of a conversion pulse are reconstructed in real time from the sample signal. An amplitude between the two reconstructed sample points is then interpolated. The output of the interpolated amplitude is output in real time. This process is repeated on subsequent conversion pulses, such that the outputted interpolated amplitudes form the higher data rate signal having a data rate equal to the conversion rate. This sample rate conversion method is further taught in co-pending application, U.S. patent application Ser. No. 10/641,034, filed Aug. 15, 2003, now U.S. Pat. No. 7,409,339, which is incorporated herein by reference in its entirety.

Audio processor 222 analyzes and processes audio signals in a variety of formats including Dolby digital and MPEG audio. Audio processor 222 delivers processed audio signals to audio outputs, including digital audio port 258 and analog audio port 259.

The control interfaces can include DDR-DRAM controller 240, EJTAG module 242, peripheral interfaces 244, and EBI interface 246. DDR-DRAM controller 240 supports the use of external DDR-DRAM. EJTAG module 242 supports advanced debugging features, including software debug of user and kernel code. Peripheral interfaces 244 provide a range of interfaces to support smart card usage, and the like. EBI (external bus interface) interface 246 supports the connection of external SRAMs, flash memories, EPROMs, and interfaces with additional external peripherals.

The output interfaces can include S-Video composite interface 250, DVI interface 252, 656 Interface 254, RF Mod interface 256, digital audio port 258 and analog audio port 259. The S-Video composite interface 250 can output video signals in a variety of formats including SCART1, S-Video, and composite video (CVBS) outputs. DVI interface 252 provides an output interface for DVI signals. 656 Interface 254 provides an output interface for analog video signals that comply with the ITU-R-656 standard.

RF Mod interface 256 provides an output interface for an analog composite television signal which is suitable for demodulation by a television demodulator. Digital audio port 258 and analog audio port 259 provide interfaces for digital and analog audio signals, respectively.

The ancillary interfaces can include V.90 interface 260, USB 2.0 interface 262, Ethernet interface 264, and SATA interface 266. V.90 interface 260 provides an interface to modems using the V.90 standard. Similarly, USB 2.0 interface 262 provides an interface to devices using a USB 2.0 standard. Ethernet interface 264 provides an interface to connect TVOC 200 to an Ethernet or provide Internet connectivity. Finally, SATA interface 266 provides an interface for use with external hard drives. System controller 270 provides overall control for TVOC 200.

Figure 4:
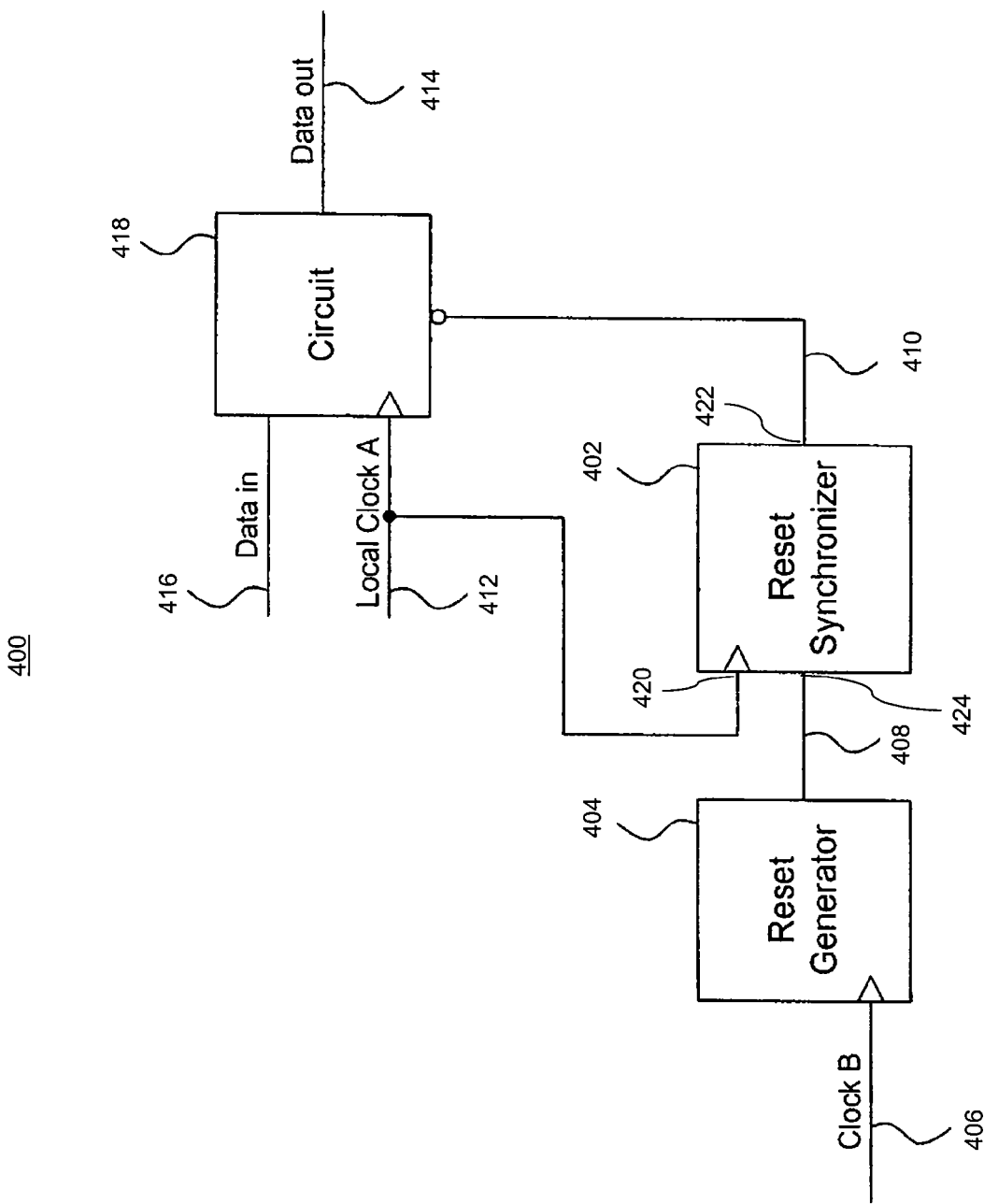
FIG. 4 illustrates a block diagram of an exemplary reset synchronization system according to embodiments of the present invention.

Additional optional elements within TVOC 200 that further facilitate the integration of television functionality on a single integrated circuit can include a reset synchronization system. An exemplary reset synchronization system 400 as illustrated in FIG. 4 showing a reset generator 404 and a circuit 418. A local clock A 412 drives circuit 418 and clock B 406 drives reset generator 404. A reset synchronizer including synchronizing circuitry 402 receives a reset signal 408 and local clock A 412. The synchronizing circuitry 402 outputs a synchronized reset signal 422 that is used to reset circuit 418 or portions thereof. Thus, a reset synchronization system includes a local clock terminal 420, a reset terminal 424, a synchronized reset output terminal 422, and synchronizing circuitry 402 coupled between the clock terminal 420, the reset terminal 424, and the synchronized reset output terminal 422. The synchronizing circuitry synchronizes a received reset signal to the local clock signal and outputs a synchronized reset signal on the synchronized reset output terminal. A reset synchronization system is further taught is co-pending application, U.S. patent application Ser. No. 10/640,632, filed Aug. 14, 2003, now U.S. Pat. No. 7,260,166, which is incorporated herein by reference in its entirety.

Optional elements within TVOC 200 that further facilitate the integration of television functionality on a single integrated circuit further include an I/O (input/output) multiplexing system. Integrated circuits, such as TVOC 200 communicate with other chips through I/O devices (e.g., pins or pads). Because function blocks are becoming smaller, and the chips denser, there is limited area on the chip for the I/O devices. To compensate for the limited area, groups or sets of the function blocks share the I/O devices. In order to share the I/O devices, a controlling system (e.g., a multiplexer) is used to direct which of the function blocks use the I/O device at a particular time (e.g., during a particular mode of the chip). A wide variety of factors—such as temperature and distance can affect timing control of I/O device signals. The I/O multiplexing system addresses the need to conserve space on TVOC 200 while also ensuring proper timing.

Figure 5:
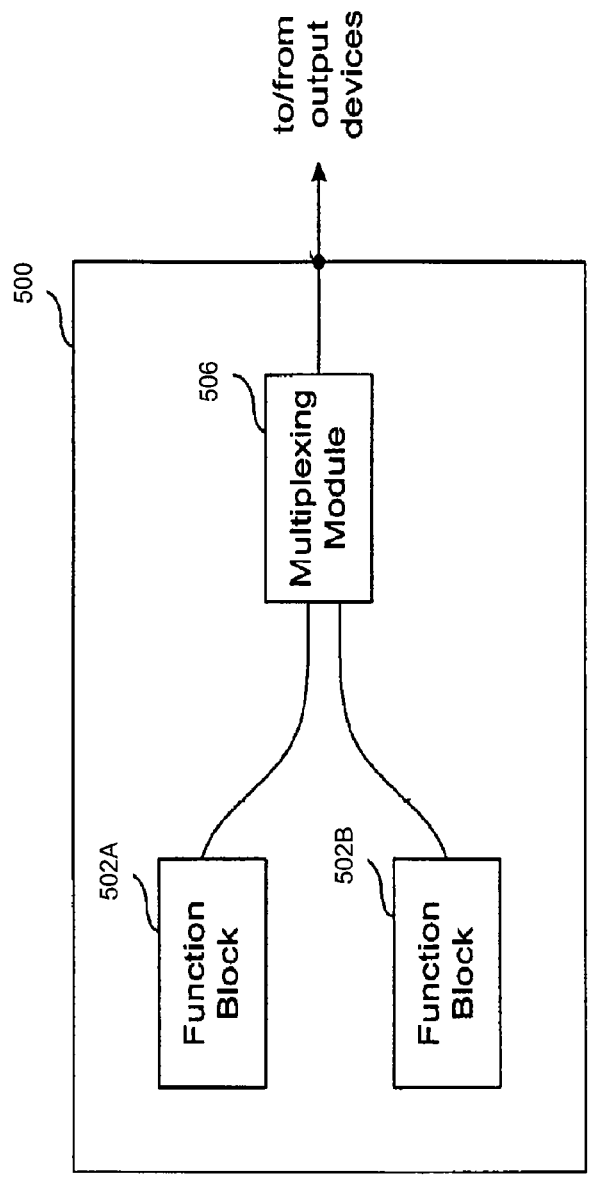
FIG. 5 shows a block diagram of a I/O multiplexer system according to embodiments of the present invention.

An exemplary I/O multiplexing system 500 as illustrated in FIG. 5 includes an input/output device including a bi-directional pad, function blocks 502A and 502B coupled to the I/O device and an I/O multiplexing module 506 that controls transmission of the signals between the function blocks 502A and 502B and the I/O device using a controller. The I/O multiplexing module 506 can include a data I/O multiplexer and an enable I/O multiplexer coupled to the controller.

Furthermore, the I/O multiplexing module can include a data re-clocking device coupled to the I/O device, the function blocks, and the data I/O multiplexer. The re-clocking device synchronizes one or more of the signals with a system clock before the one or more signals enter the data I/O multiplexer. In this case, the I/O multiplexing module also includes an enable re-clocking device coupled to the I/O device, the function blocks, and the enable I/O multiplexer. The re-clocking device synchronizes one or more of the signals with a system clock before the one or more signals enter the enable I/O multiplexer. The I/O multiplexing system is further taught in co-pending application, U.S. patent application Ser. No. 10/640,649, filed Aug. 14, 2003, which is incorporated herein by reference in its entirety.

Optional elements within TVOC 200 that further facilitate the integration of television functionality on a single integrated circuit can further include an adaptable strapping system. TVOC 200 can have numerous selectable functions, for example, selectable video encoding standards. In order to properly set the function of TVOC 200, a mode or state can be selected for TVOC 200 based on the product it is incorporated within. The mode or state can be selected using a strapping system (e.g., mode or state setting system) in a variety of ways, including using a dedicated pin, a register control block controlled by software running in the product, or the like. Thus, because a designer knows what product is being made, when the chip is inserted into the product, a function of the device can be set using a signal that designates a mode or state.

Figure 6:
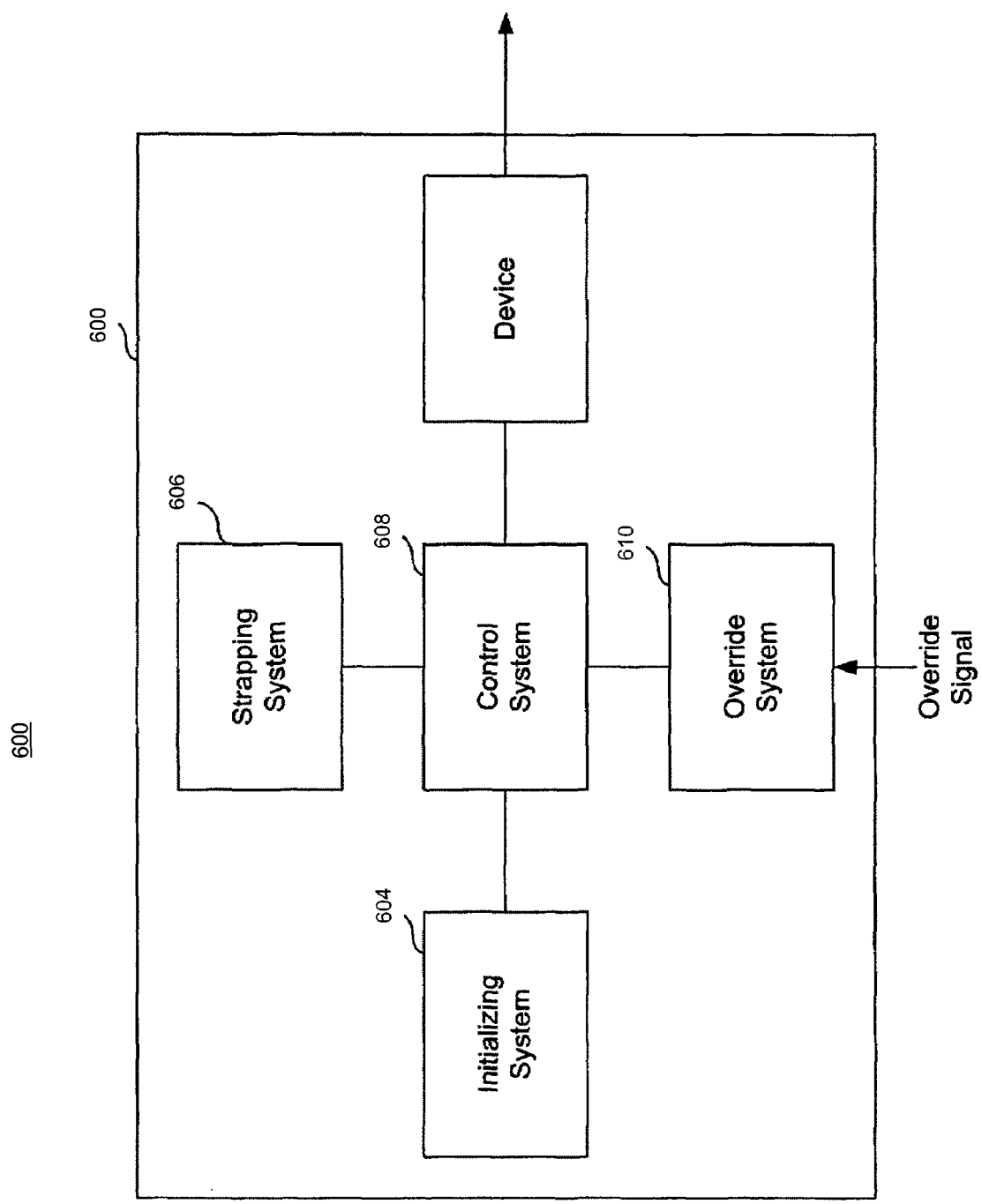
FIG. 6 illustrates a block diagram of an exemplary adaptable strapping system according to an embodiment of the present invention.

Using a strapping system, such as the one described herein, is useful because it does not require using a dedicated pin. Pins are in limited supply on a chip, and avoiding having to use one to set a mode of the device is desired. Furthermore, the adaptable strapping system of the present invention allows TVOC 200 to use alternate functions after packaging in real time. An exemplary strapping system 600 as illustrated in FIG. 6 includes a control system 608 that controls a mode of TVOC 200, an initialization system 604 that transmits a signal to the control system 608 to initialize TVOC 200, an internal strapping system 606 that transmits a signal to the control system 608 that can be used to place TVOC 200 in a first state, and an override system 610 that transmits a second signal to the control system to place TVOC 200 in a second state. The adaptable strapping system is further taught in co-pending application, U.S. patent application Ser. No. 10/641,103, filed Aug. 15, 2003, which is incorporated by reference herein in its entirety.

Optional elements within TVOC 200 that further facilitate the integration of television functionality on a single integrated circuit can further include a system for multi-channel audio interconnects. Traditional processing of audio signals transferred between audio modules, such as analog-to-digital converters, error correction devices and digital filters, within a printed circuit board or an IC typically requires conversion of the related audio signals to an inter-IC sound ($I^2S$) standard or a similar format. $I^2S$ is one technique intended to standardize the format of audio data transferred between these internal components. Components implementing the widely accepted I²S standard convert incoming audio data signals into the I²S format.

As the speed at which micro-electronic large scale integrated (LSI) devices operate increases, the time required to perform the I²S conversion becomes a critical system limitation. The chip space required to accommodate the three I²S pins has become equally burdensome. Although other serial data bus designs are available, even some with 1-line data links, most are too complex or lack sufficient flexibility for extensive use. The system for multi-channel audio interconnects provides a data bus that can be used to transfer audio data that minimizes the complexities and amount of hardware required for transferring audio data between modules. A suite of protocols support this bus to more efficiently transfer data between the modules, ultimately reducing the number of chip pins.

Figure 7:
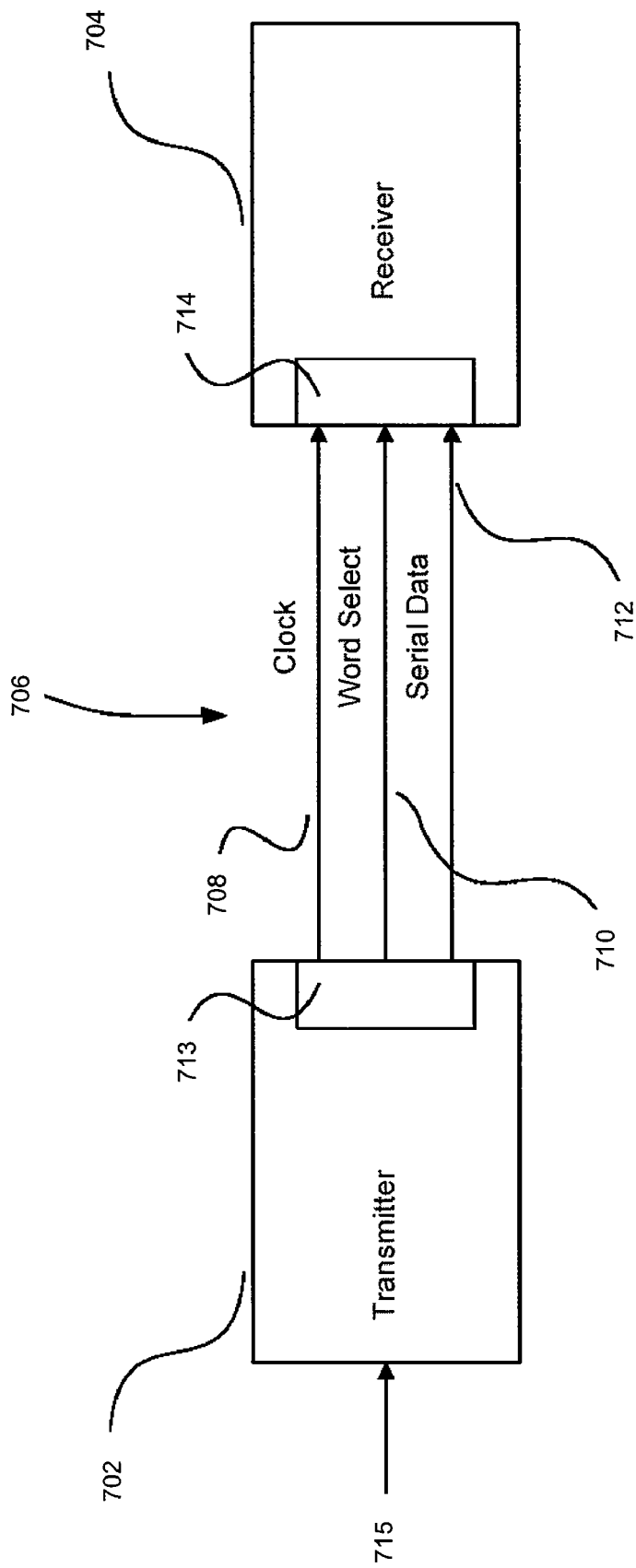
FIG. 7 illustrates a block diagram of an exemplary multi-channel audio interconnect system.

When this embodiment is used, a multi-channel audio interconnect system includes data paths that are configured for transferring audio data between a transmitting module and one or more receiving modules. An exemplary multi-channel audio interconnect system 700 as illustrated in FIG. 7. System 700 includes an encoder positioned within the transmitting module and configured to convert audio data requiring transmission into two-line audio information segments. As shown in FIG. 7, the system 700 includes the 3-line data bus 706 for transferring input audio information 715 between the transmitter 702 and the receiver 704. In order to accommodate this information transfer, the I2S protocol suite may be used for formatting the clock bit data transferred along the clock line 708, the word select data 710, and the serial data stream 712.

Transmitter 702 of FIG. 7 includes a standard audio encoder 713 configured for converting received data 715 into a format for transfer across the data bus 706. The receiver 704 includes a conventional audio decoder 714 configured to decode the encoded audio data received via the data path 706. The encoder 713 can be used, for example, to convert received audio PCM data into an I2S format or the popular Sony/Philips digital interface (SPDIF) format. The audio information segments include a format portion identifying the audio format and a data portion for carrying the audio data. A data line and a synchronization line exist between audio modules. The data line carries the audio information segments, while the synchronization line transmits a number of sync pulses that indicate a start of one of the audio information segments. A decoder is included in a receiving module that interprets the audio information segments and sync pulses. The multi-channel audio interconnect system is further taught in co-pending application, U.S. patent application Ser. No. 10/646,833, filed Aug. 25, 2003, which is incorporated herein by reference in its entirety.

Optional elements within TVOC 200 that further facilitate the integration of television functionality on a single integrated circuit can include circuits and methods to enhance scan testing. Scan testing provides an effective means to test the structural integrity of devices, such as flip-flops, within a complex integrated circuit, such as TVOC 200. Within TVOC 200, features may be enabled or disabled depending upon TV manufacturer preferences. This flexibility can make scan testing more complex. Circuits to support scan testing and reduce this complexity can be provided. These circuits are taught in the following co-pending applications, U.S. patent application Ser. No. 10/640,687, filed Aug. 14, 2003 (now U.S. Pat. No. 7,131,045), U.S. patent application Ser. No. 10/640,659, filed Aug. 14, 2003 (now U.S. Pat. No. 7,058,868), and U.S. patent application Ser. No. 10/640,686, filed Aug. 14, 2003 (now U.S. Pat. No. 7,089,471). All of which are incorporated herein by reference in their entireties.

CONCLUSION

While various embodiments of the present invention have been described above, it should be understood that they have been presented by way of example, and not limitation. It will be apparent to persons skilled in the relevant art that various changes in form and detail can be made therein without departing from the spirit and scope of the invention.

The present invention has been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software and the like or any combination thereof. Thus, the breadth and scope of the present invention should not be limited by any of the above-described exemplary embodiments, but should be defined only in accordance with the following claims and their equivalents.

What is claimed is:

1. An integrated circuit for providing television functionality, comprising:
   a plurality of input elements;
   video and graphics processing elements, comprising
      an analog video decoder;
      a digital video decoder;
      a video and graphics processing module coupled to said analog video decoder and said digital video decoder; and
      a video encoder, coupled to said video and graphics processing module, including a MPAA HDTV copy protection filter system;
   audio processing elements;
   output interfaces; and
   a control element, wherein said plurality of input elements, said video and graphics processing elements, said audio processing elements, and said output interfaces are coupled through a system controller.

2. The integrated circuit of claim 1, wherein said plurality of input elements comprise:
   an IF demodulator; and
   a data transport module.

3. The integrated circuit of claim 2, wherein said IF demodulator comprises a digital IF demodulator.

4. The integrated circuit of claim 2, wherein said IF demodulator includes an FM demodulation system for approximating $y(n)=1/x(n)$ in FM demodulation, where $x(n)=I^2(n)+Q^2(n)$.

5. The integrated circuit of claim 2, wherein said data transport module includes a video data stream front end processor.

6. The integrated circuit of claim 2, wherein said data transport module includes a packet substitution module.

7. The integrated circuit of claim 1, wherein said analog video decoder includes a 2D adaptive comb filter.

8. The integrated circuit of claim 1, wherein said digital video decoder includes an artificial time stamp module that generates pseudo MPEG information from received DV25 or DV50 digital video information.

9. The integrated circuit of claim 1, wherein said digital video decoder includes a 2D adaptive comb filter.

10. An integrated circuit for providing television functionality, comprising:
- a plurality of input elements;
- video and graphics processing elements;
- audio processing elements, comprising:
  - an audio decoder including a digital signal processor (DSP) decoder having an execution unit, an address generator and an instruction set to decode input signals, wherein said digital signal processor decoder is reprogrammable and updateable; and
  - an audio processor;
- output interfaces; and
- a control element, wherein said plurality of input elements, said video and graphics processing elements, said audio processing elements, and said output interfaces are coupled through a system controller.

11. The integrated circuit of claim 10, wherein said plurality of input elements comprise:
- an IF demodulator; and
- a data transport module.

12. The integrated circuit of claim 11, wherein said data transport module includes a video data stream front end processor.

13. The integrated circuit of claim 11, wherein said data transport module includes a packet substitution module.

14. The integrated circuit of claim 10, wherein said video and graphics processing elements comprise:
- an analog video decoder;
- a digital video decoder;
- a video and graphics processing module coupled to said analog video decoder and said digital video decoder; and
- a video encoder coupled to said video and graphics processing module.

15. The integrated circuit of claim 14, wherein said analog video decoder includes a 2D adaptive comb filter.

16. The integrated circuit of claim 14, wherein said digital video decoder includes an artificial time stamp module that generates pseudo MPEG information from received DV25 or DV50 digital video information.

17. The integrated circuit of claim 14, wherein said digital video decoder includes a 2D adaptive comb filter.

* * * * *